United States Patent
Wang

(10) Patent No.: US 12,549,563 B2
(45) Date of Patent: Feb. 10, 2026

(54) METHOD FOR OBTAINING FILE BASED ON OVER-THE-AIR OTA TECHNOLOGY AND RELATED DEVICE

(71) Applicant: Shenzhen Yinwang Intelligent Technologies Co., Ltd., Shenzhen (CN)

(72) Inventor: Yong Wang, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 169 days.

(21) Appl. No.: 18/464,062

(22) Filed: Sep. 8, 2023

(65) Prior Publication Data

US 2023/0421571 A1 Dec. 28, 2023

Related U.S. Application Data

(63) Continuation of application No. PCT/CN2021/079834, filed on Mar. 9, 2021.

(51) Int. Cl.
*H04L 9/40* (2022.01)
*H04W 4/44* (2018.01)

(52) U.S. Cl.
CPC ............. *H04L 63/123* (2013.01); *H04W 4/44* (2018.02)

(58) Field of Classification Search
CPC .................................................... H04L 63/123
See application file for complete search history.

(56) References Cited

U.S. PATENT DOCUMENTS

| | | | | |
|---|---|---|---|---|
| 9,161,218 | B2 * | 10/2015 | Bae | H04L 63/067 |
| 9,747,096 | B2 * | 8/2017 | Searle | G06F 8/65 |
| 9,753,719 | B2 * | 9/2017 | Hilliar | H04W 12/03 |
| 9,916,151 | B2 * | 3/2018 | Ye | H04W 12/10 |
| 2010/0235891 | A1 | 9/2010 | Oglesbee et al. | |
| 2016/0117162 | A1 | 4/2016 | Searle et al. | |
| 2017/0060559 | A1 | 3/2017 | Ye et al. | |
| 2023/0421571 | A1 * | 12/2023 | Wang | H04W 4/50 |

FOREIGN PATENT DOCUMENTS

| | | |
|---|---|---|
| CN | 104134122 A | 11/2014 |
| CN | 110868406 A | 3/2020 |
| CN | 111510485 A | 8/2020 |
| CN | 112055952 A | 12/2020 |
| JP | 2019196158 A | 11/2019 |
| JP | 2020173832 A | 10/2020 |
| WO | 2019083440 A2 | 5/2019 |
| WO | 2021024792 A1 | 2/2021 |

* cited by examiner

*Primary Examiner* — Michael A Berns
(74) *Attorney, Agent, or Firm* — Leydig, Voit & Mayer, Ltd.

(57) ABSTRACT

Embodiments of this application disclose a method for obtaining a file based on an over-the-air OTA technology and a related device. The method includes: A first vehicle obtains a target request, where the target request includes target service information, and the target service information is used to obtain a target file associated with a target function; the first vehicle sends the target request to a server; and the first vehicle receives the target file requested by the target request, where the target file is used to indicate the first vehicle to implement the target function. According to this application, a file can be obtained based on the OTA technology, and file management can be simplified.

24 Claims, 22 Drawing Sheets

METHOD FOR OBTAINING FILE BASED ON OVER-THE-AIR OTA TECHNOLOGY AND RELATED DEVICE

CROSS-REFERENCE TO RELATED APPLICATIONS

This application is a continuation of International Application No. PCT/CN2021/079834, filed on Mar. 9, 2021, the disclosure of which is hereby incorporated by reference in its entirety.

TECHNICAL FIELD

This application relates to the field of in-vehicle technologies, and in particular, to a method for obtaining a file based on an over-the-air OTA technology and a related device.

BACKGROUND

In related technologies, when a vehicle needs to implement a specific service function, the vehicle needs to obtain a file corresponding to the service function from an external dedicated file server. Because the vehicle includes a plurality of components, and each component may be installed with a plurality of pieces of software implementing different service functions, managing files corresponding to different service functions of the vehicle by the file server is complex and inefficient.

For example, a use license file (a file used for software protection) may be used to enable a service function of a vehicle. A server provides a target file for a user, and the target file controls running of software, so that the software is used within an authorization scope. In this way, the vehicle implements a customized function. Generation, delivery, and management of target files of the entire vehicle are completed by a dedicated license server. Due to a complex internal structure of the vehicle, various service function modules, and different resource permission, management of license files of the entire vehicle is complex.

SUMMARY

Embodiments of this application provide a method for obtaining a file based on an over-the-air OTA technology and a related device, to implement file obtaining based on the OTA technology, and simplify management of a file associated with a vehicle function.

According to a first aspect, an embodiment of this application provides a method for obtaining a file based on an over-the-air OTA technology. The method includes:

A first vehicle obtains a target request, where the target request includes target service information, and the target service information is used to obtain a target file associated with a target function;

the first vehicle sends the target request to a server; and the first vehicle receives the target file requested by the target request, where the target file is used to indicate the first vehicle to implement the target function.

In related technologies, when the vehicle needs to implement a specific service function, the vehicle needs to obtain a file corresponding to the service function from an external dedicated file server. Because the vehicle includes a plurality of components, and each component may be installed with a plurality of pieces of software implementing different service functions, managing files by the file server are complex and inefficient. In this embodiment of this application, based on the related OTA technology, when the vehicle performs OTA remote firmware/software upgrade, a remote upgrade channel is established between the server and the vehicle (including the master vehicle control unit and the one or more slave vehicle units). The master vehicle control unit has features of managing hardware information of each slave vehicle control unit and software version information corresponding to at least one piece of software installed on each slave vehicle control unit, and distributing an upgrade package for software on each slave vehicle control unit. After receiving the target request including the target service information, the vehicle initiates a related request to the server by reusing the OTA remote upgrade channel between the server and the vehicle, and receives, based on the OTA technology, the target file that is associated with the target function and that is sent by the server, to implement the target function based on the target file. In this way, a service-associated file can be obtained based on the OTA technology. In conclusion, in this application, the OTA remote upgrade channel between the server and the vehicle is reused, to avoid complex function-associated file management caused by a need to create a file management channel and a need to use a dedicated file server to complete generation, delivery, and management of function-associated files of the entire vehicle. In addition, the user may purchase a corresponding service for the vehicle based on a customized requirement. A customized requirement of the user can be met, purchase costs can be reduced, and user experience can be improved.

In a possible implementation, that the first vehicle sends the target request to a server includes: The first vehicle sends the target request to the server by using the OTA technology.

In a possible implementation, that the first vehicle receives the target file requested by the target request includes: The first vehicle receives, by using the OTA technology, the target file requested by the target request.

In a possible implementation, the method further includes: The first vehicle performs signature verification on the target file; and the first vehicle implements the target function based on the target file if signature verification of the target file succeeds.

The first vehicle in this embodiment of this application may include a master vehicle control unit and one or more slave vehicle control units. The target function is a function implemented by a target slave vehicle control unit in the one or more slave vehicle control units. Specifically, the master vehicle control unit may perform signature verification on the target file. If signature verification on the target file succeeds, the master vehicle control unit sends the target file to the target slave vehicle control unit. In this embodiment of this application, when the signed target file obtained from the outside of the vehicle is verified, the first vehicle implements the target function based on the target file inside the first vehicle, to ensure security of implementing the target function of the first vehicle.

In a possible implementation, the method further includes: The first vehicle checks validity of the target file; and the first vehicle implements the target function based on the target file if validity check of the target file succeeds.

In this embodiment of this application, the first vehicle checks validity of the target file with the master vehicle control unit or the target slave vehicle control unit. When validity of the target file obtained from the outside of the vehicle is checked, the vehicle implements the target function based on the target file. In this way, a situation in which the target function cannot be implemented because a received target file is not the target file corresponding to the target function can be avoided, and efficiency and security of implementing the target function of the first vehicle can be ensured.

In a possible implementation, the target request further includes hardware information of the first vehicle, the target file includes a device feature code generated based on the hardware information, and that the first vehicle checks validity of the target file includes: The first vehicle determines whether the hardware information matches the device feature code; and if the hardware information matches the device feature code, determines that the target file is a valid file.

The hardware information of the first vehicle included in the target request may be hardware information of a target slave vehicle control unit in the first vehicle. The target file includes a device feature code generated based on the hardware information of the slave vehicle control unit. The first vehicle determines whether the target file is valid by determining whether the hardware information of the target slave vehicle control unit matches the device feature code. In this embodiment of this application, when validity of the target file obtained from the outside of the vehicle is checked, the first vehicle implements the target function based on the target file. In this way, a situation in which the target function cannot be implemented because the received target file is not the target file corresponding to the target function can be avoided, and efficiency and security of implementing the target function of the first vehicle can be ensured.

In a possible implementation, the method further includes: The first vehicle detects, based on the target service information and at least one piece of software version information corresponding to the first vehicle, whether software corresponding to the target function is installed on the first vehicle.

In this embodiment of this application, the at least one piece of software version information corresponding to the first vehicle may be at least one piece of software version information corresponding to at least one piece of software installed on the target slave vehicle control unit. When obtaining the target service information, the first vehicle may determine, based on the at least one piece of software version information corresponding to the at least one piece of software installed on the target slave vehicle control unit and the target service information, whether the software corresponding to the target function is installed on the target slave vehicle control unit, to further ensure implementation of the target function.

In a possible implementation, the method further includes: If the software corresponding to the target function is not installed on the first vehicle, the first vehicle sends, to the server, an installation package obtaining request for the software corresponding to the target function.

In this embodiment of this application, if the software corresponding to the target function is not installed on the first vehicle, the first vehicle sends, to the server with the master vehicle control unit, an installation package obtaining request for the software corresponding to the target function, to further ensure implementation of the target function after the vehicle is installed with the software corresponding to the target function.

In a possible implementation, the method further includes:

The first vehicle receives an installation package sent based on the installation package obtaining request by the server, and performs signature verification on the installation package; and if signature verification of the installation package succeeds, based on the installation package, the first vehicle is installed with the software corresponding to the target function, and implements the target function based on the software and the target file.

In this embodiment of this application, the first vehicle may receive, through the master vehicle control unit, the installation package sent based on the installation package obtaining request by the server, and perform signature verification on the installation package. If signature verification succeeds, the master vehicle control unit sends the installation package to the target slave vehicle control unit. The target slave vehicle control unit is installed with the software corresponding to the target function based on the installation package, and implements the target function based on the software and the target file. In this embodiment of this application, when the software corresponding to the target function is installed on the target slave vehicle control unit, the target slave vehicle control unit implements the target function based on the software. In this way, implementation of the target function can be ensured.

In a possible implementation, the target request further includes at least one piece of software version information corresponding to the first vehicle, and the method further includes: The first vehicle receives an installation package that is of software corresponding to the target function and that is sent by the server, and performing signature verification on the installation package, where the installation package is sent by the server when the server detects, based on the target service information and the software version information, that the software corresponding to the target function is not installed on the first vehicle; and if signature verification of the installation package succeeds, based on the installation package, the first vehicle is installed with the software corresponding to the target function, and implements the target function based on the software and the target file.

In this embodiment of this application, when the target request further includes the at least one piece of software version information corresponding to the first vehicle, the target request is further used to indicate the server to detect, based on the at least one piece of software version information and the target service information, whether the software corresponding to the target function is installed on the target slave vehicle control unit of the vehicle. If the server detects that the software corresponding to the target function is not installed on the first vehicle, the server sends, to the vehicle, the installation package of the software corresponding to the target function. Then the first vehicle is installed with, based on the installation package, the software corresponding to the target function, and implements the target function based on the software corresponding to the target function and the target file, to ensure implementation of the target function. The target file is delivered based on the OTA technology, and the remote firmware/software upgrade channel between the server and the first vehicle is reused, to avoid complex file management caused by a need to create a file management channel.

In a possible implementation, the first vehicle includes a master vehicle control unit and one or more slave vehicle control units; the target function is a function implemented by a target slave vehicle control unit in the one or more slave vehicle control units; and that the first vehicle receives the target file requested by the target request includes: The master vehicle control unit receives the target file requested by the target request; and the master vehicle control unit sends the target file to the target slave vehicle control unit, where the target file is used to indicate the target slave vehicle control unit to implement the target function based on the target file.

In this embodiment of this application, based on a related OTA technology, when a vehicle performs OTA remote firmware/software upgrade, a remote upgrade channel is established between a server and the vehicle (including a master vehicle control unit and one or more slave vehicle units). The master vehicle control unit has features of managing hardware information of each slave vehicle control unit and software version information corresponding to at least one piece of software installed on each slave vehicle control unit, and distributing an upgrade package for software on each slave vehicle control unit. After receiving the target request including the target service information, the vehicle initiates a related request to the server by reusing the OTA remote upgrade channel between the server and the vehicle, and receives, based on the OTA technology, the target file that is associated with the target function and that is sent by the server. After receiving the target file sent by the server, the master vehicle control unit distributes the target file based on hardware information of each slave vehicle control unit that is internally managed and software version information corresponding to at least one piece of software installed on each slave vehicle control unit, so that the target slave vehicle control unit implements a target function based on the target file. In this way, obtaining a service-associated file based on the OTA technology is implemented. In conclusion, in this application, the OTA remote upgrade channel between the server and the vehicle is reused, to avoid complex function-associated file management caused by a need to create a file management channel and a need to use a dedicated file server to complete generation, delivery, and management of function-associated files of the entire vehicle. In addition, the user may purchase a corresponding service for the vehicle based on a customized requirement. A customized requirement of the user can be met, purchase costs can be reduced, and user experience can be improved.

In a possible implementation, the first vehicle further includes a human-machine interface (HMI) and that the first vehicle obtains a target request includes: The first vehicle obtains the target request through the HMI.

In this embodiment of this application, the user may subscribe to the target function through the HMI. This is convenient for the user.

In a possible implementation, the method further includes: The first vehicle sends a state of the target function to the server, where the state of the target function includes whether the target function is implemented and/or a validity period of the target function.

In this embodiment of this application, the target slave vehicle control unit may periodically send the state of the target function to the master vehicle control unit, and the master vehicle control unit sends the state of the target function to the server, so that the server can manage the target file delivered to the first vehicle. In addition, the master vehicle control unit displays the state of the target function to the user, so that the user learns of a usage state of the target function, the validity period of the target function, and the like through the HMI.

In a possible implementation, the target request further includes one or more of the validity period of the target function, the hardware information of the first vehicle, and the at least one piece of software version information corresponding to the first vehicle; and the target file is generated by the server based on one or more of the target service information, the validity period of the target function, the hardware information, and the at least one piece of software version information.

In this embodiment of this application, a situation in which the target file delivered by the server is not for the target slave control unit or current version information of the software corresponding to the target function can be avoided. In this way, a situation in which the target function cannot be implemented can be avoided. When receiving the target request, the server generates, based on the hardware information of the first vehicle (that is, the hardware information of the target slave vehicle control unit) and the at least one piece of software version information corresponding to the first vehicle (that is, the at least one piece of software version information corresponding to the at least one piece of software installed on the target slave vehicle control unit) in the target request, the target file matching the target function, the hardware information, and the software that corresponds to the target function. In this way, it can be ensured that target service implementation is efficient and well targeted.

In this embodiment of this application, the target file includes a use license file of the target function.

In this embodiment of this application, the server provides the license file for the user, and the license file controls running of software, so that the software is used within an authorization scope, and a vehicle can implement a customized function.

According to a second aspect, an embodiment of this application provides a method for obtaining a file based on an over-the-air OTA technology. The method includes:

A server receives a target request sent by a first vehicle, where the target request includes target service information, and the target service information is used to obtain a target file associated with a target function;

the server generates the corresponding target file based on the target request; and the server sends the target file to the first vehicle, where the target file is used to indicate the first vehicle to implement the target function.

In related technologies, when the vehicle needs to implement a specific service function, the vehicle needs to obtain a file corresponding to the service function from an external dedicated file server. Because the vehicle includes a plurality of components, and each component may be installed with a plurality of pieces of software implementing different service functions, managing files corresponding to different service functions of the vehicle by a file server are complex and inefficient. In this embodiment of this application, based on the related OTA technology, when the vehicle performs OTA remote firmware/software upgrade, a remote upgrade channel is established between the server and the vehicle (including the master vehicle control unit and the one or more slave vehicle units). The master vehicle control unit has features of managing hardware information of each slave vehicle control unit and software version information corresponding to at least one piece of software installed on each slave vehicle control unit, and distributing an upgrade package for software on each slave vehicle control unit. After receiving the target request including the target service information, the vehicle initiates a related request to the server by reusing the OTA remote upgrade channel between the server and the vehicle, and the server sends, to the first vehicle based on the OTA technology, the target file associated with the target function. In this way, the first vehicle can implement the target function based on the target file, and a service-associated file can be obtained based on the OTA technology. In conclusion, in this application, the OTA remote upgrade channel between the server and the vehicle is reused, to avoid complex function-associated file management caused by a need to create a file management channel and a need to use a dedicated file server to complete generation, delivery, and management of function-associated files of the entire vehicle. In addition, the user may purchase a corresponding service for the vehicle based on a customized requirement. A customized requirement of the user can be met, purchase costs can be reduced, and user experience can be improved.

In a possible implementation, that a server receives a target request sent by a first vehicle includes: The server receives, by using an OTA technology, the target request sent by the first vehicle.

In a possible implementation, that the server sends the target file to the first vehicle includes: The server sends the target file to the first vehicle by using the OTA technology.

In a possible implementation, the method further includes: The server signs the target file.

In a possible implementation, the target request further includes at least one piece of software version information corresponding to the first vehicle, and the method further includes: The server detects, based on the at least one piece of software version information and the target service information, whether software corresponding to the target function is installed on the first vehicle; and if the software corresponding to the target function is not installed on the first vehicle, the server sends, to the first vehicle, an installation package of the software corresponding to the target function, where the installation package is used to install, on the first vehicle based on the installation package, the software corresponding to the target function.

In a possible implementation, the target request further includes one or more of a validity period of the target function, hardware information of the first vehicle, and the at least one piece of software version information corresponding to the first vehicle.

In a possible implementation, that the server generates the corresponding target file based on the target request includes:

The server generates a device feature code based on the hardware information of the first vehicle; the server generates a resource control item and a function control item based on the at least one piece of software version information corresponding to the first vehicle; and the server generates the target file based on the target service information, the validity period of the target function, the device feature code, the resource control item, and the function control item.

In this embodiment of this application, a situation in which the target file delivered by the server is not a target file that is for the first vehicle or current version information of the software corresponding to the target function can be avoided. In this way, a situation in which the target function cannot be implemented can be avoided. When receiving the target request, the server generates, based on the hardware information of the first vehicle (that is, the hardware information of the target slave vehicle control unit) and the at least one piece of software version information corresponding to the first vehicle (that is, the at least one piece of software version information corresponding to the at least one piece of software installed on the target slave vehicle control unit) in the target request, the target file matching the target function, the hardware information, and the software that corresponds to the target function and that is installed on the target control unit. In this way, it can be ensured that target service implementation is efficient and well targeted.

In a possible implementation, the method further includes: The server receives a state of the target function that is sent by the first vehicle, where the state of the target function includes whether the target function is enabled and/or the validity period of the target function.

In a possible implementation, the target file includes a use license file of the target function.

According to a third aspect, an embodiment of this application provides a method for obtaining a file based on an over-the-air OTA technology. The method is applied to a first vehicle, where the first vehicle includes a master vehicle control unit and one or more slave vehicle control units. The method includes:

The master vehicle control unit obtains a target request, where the target request includes target service information, the target service information is used to obtain a target file associated with a target function, and the target function is a function implemented by a target slave vehicle control unit in the one or more slave vehicle control units;

the master vehicle control unit sends a target request to a server;

the master vehicle control unit receives the target file requested by the target request; and the master vehicle control unit sends the target file to the target slave vehicle control unit, where the target file is used to indicate the target slave vehicle control unit to implement the target function based on the target file.

In a possible implementation, the method further includes:

The master vehicle control unit performs signature verification on the target file; and if signature verification of the target file succeeds, the master vehicle control unit performs the operation of sending the target file to the target slave vehicle control unit.

In a possible implementation, the method further includes:

The target slave vehicle control unit checks validity of the target file; and if validity check of the target file succeeds, the target slave vehicle control unit implements the target function based on the target file.

In a possible implementation, the target request further includes hardware information of the target slave vehicle control unit; the target file includes a device feature code generated based on the hardware information; and that the target slave vehicle control unit checks validity of the target file includes:

The target slave vehicle control unit determines whether the hardware information matches the device feature code; and if the hardware information matches the device feature code, determines that the target file is a valid file.

In a possible implementation, the method further includes:

The master vehicle control unit detects, based on the target service information and at least one piece of software version information corresponding to at least one piece of software installed on the target slave vehicle control unit in the first vehicle, whether the software corresponding to the target function is installed on the target slave vehicle control unit.

In a possible implementation, the method further includes:

If the software corresponding to the target function is not installed on the target slave vehicle control unit, the master vehicle control unit sends, to the server, an installation package obtaining request for the software corresponding to the target function.

In a possible implementation, the method further includes:

The master vehicle control unit receives the installation package sent based on the installation package obtaining request by the server, and performs signature verification on the installation package. If signature verification of the installation package succeeds, the master vehicle control unit sends the installation package to the target slave vehicle control unit. The target slave vehicle control unit is installed with the software corresponding to the target function based on the installation package, and implements the target function based on the software and the target file.

In a possible implementation, the target request further includes the at least one piece of software version information corresponding to the first vehicle. The method further includes:

The master vehicle control unit receives the installation package that is of the software corresponding to the target function and that is sent by the server, and performs signature verification on the installation package, where the installation package is sent by the server when the server detects, based on the target service information and the software version information, that the software corresponding to the target function is not installed on the first vehicle. If signature verification of the installation package succeeds, the master vehicle control unit sends the installation package to the target slave vehicle control unit. The target slave vehicle control unit is installed with the software corresponding to the target function based on the installation package, and implements the target function based on the software and the target file.

In a possible implementation, the first vehicle further includes a human-machine interface, and that the master vehicle control unit obtains a target request includes:

The master vehicle control unit obtains the target request through the human-machine interface.

In a possible implementation, the method further includes:

The master vehicle control unit sends a state of the target function to the server and/or the human-machine interface, where the state of the target function includes whether the target function is implemented and/or a validity period of the target function.

In a possible implementation, the target request further includes one or more of the validity period of the target function, the hardware information of the first vehicle, and at least one piece of software version information corresponding to at least one piece of software installed on the target slave vehicle control unit on the first vehicle; and the target file is generated by the server based on one or more of the target service information, the validity period of the target function, the hardware information, and the at least one piece of software version information.

In a possible implementation, the target file includes a use license file of the target function.

According to a fourth aspect, an embodiment of this application provides a vehicle, including:
    an obtaining unit, configured to obtain a target request, where the target request includes target service information, and the target service information is used to obtain a target file associated with a target function;
    a sending unit, configured to send the target request to a server; and
    a receiving unit, configured to receive the target file requested by the target request, where the target file is used to indicate the vehicle to implement the target function.

In a possible implementation, the obtaining unit is specifically configured to obtain the target request by using an OTA technology, where the target request includes the target service information, and the target service information is used to obtain the target file associated with the target function.

In a possible implementation, the sending unit is specifically configured to send the target request to the server by using the OTA technology.

In a possible implementation, the vehicle further includes:
    a signature verification unit, configured to perform signature verification on the target file, where the vehicle implements the target function based on the target file if signature verification of the target file succeeds.

In a possible implementation, the vehicle further includes:
    a validity check unit, configured to check validity of the target file, where the vehicle implements the target function based on the target file if validity check of the target file succeeds.

In a possible implementation, the target request further includes hardware information of the vehicle; the target file includes a device feature code generated based on the hardware information; and the validity check unit is specifically configured to determine whether the hardware information matches the device feature code, and if the hardware information matches the device feature code, determine that the target file is a valid file.

In a possible implementation, the vehicle further includes:
    an installation detection unit, configured to detect, based on the target service information and at least one piece of software version information corresponding to the vehicle, whether software corresponding to the target function is installed on the vehicle.

In a possible implementation, the sending unit is further configured to: if the software corresponding to the target function is not installed on the vehicle, send, to the server, an installation package obtaining request for the software corresponding to the target function.

In a possible implementation, the vehicle further includes:
    a first installation unit, configured to receive the installation package sent based on the installation package obtaining request by the server, and perform signature verification on the installation package; and if signature verification of the installation package succeeds, based on the installation package, install the software corresponding to the target function, and implement the target function based on the software and the target file.

In a possible implementation, the target request further includes the at least one piece of software version information corresponding to the vehicle. The vehicle further includes:
    a second installation unit, configured to receive the installation package that is of the software corresponding to the target function and that is sent by the server, and perform signature verification on the installation package, where the installation package is sent by the server when the server detects, based on the target service information and the software version information, that the software corresponding to the target function is not installed on the vehicle; and if signature verification of the installation package succeeds, install the software corresponding to the target function based on the installation package, and implement the target function based on the software and the target file.

In a possible implementation, the vehicle includes a master vehicle control unit and one or more slave vehicle control units. The target function is a function implemented by a target slave vehicle control unit in the one or more slave vehicle control units. The receiving unit is specifically configured to:

receive, through the master vehicle control unit, the target file requested by the target request; and send, through the master vehicle control unit, the target file to the target slave vehicle control unit, where the target file is used to indicate the target slave vehicle control unit to implement the target function based on the target file.

In a possible implementation, the vehicle further includes a human-machine interface. The obtaining unit is specifically configured to obtain the target request through the human-machine interface.

In a possible implementation, the sending unit is further configured to send a state of the target function to the server, where the state of the target function includes whether the target function is enabled and/or a validity period of the target function.

In a possible implementation, the target request further includes one or more of the validity period of the target function, the hardware information of the vehicle, and the at least one piece of software version information corresponding to the vehicle; and the target file is generated by the server based on one or more of the target service information, the validity period of the target function, the hardware information, and the at least one piece of software version information.

In a possible implementation, the target file includes a use license file of the target function.

According to a fifth aspect, an embodiment of this application provides a server, and the server includes:

a receiving unit, configured to receive a target request sent by a first vehicle, where the target request includes target service information, and the target service information is used to obtain a target file associated with a target function;

a generation unit, configured to generate the corresponding target file based on the target request; and a sending unit, configured to send the target file to the first vehicle, where the target file is used to indicate the first vehicle to implement the target function.

In a possible implementation, the receiving unit is specifically configured to receive, by using an OTA technology, the target request sent by the first vehicle.

In a possible implementation, the sending unit is specifically configured to send the target file to the first vehicle by using the OTA technology.

In a possible implementation, the server further includes: a signature unit, configured to sign the target file.

In a possible implementation, the target request further includes at least one piece of software version information corresponding to the first vehicle. The server further includes an installation detection unit configured to detect, based on the at least one piece of software version information and the target service information, whether software corresponding to the target function is installed on the first vehicle.

The sending unit is further configured to: if the software corresponding to the target function is not installed on the first vehicle, send, to the first vehicle, an installation package of the software corresponding to the target function, where the installation package is used to install, on the first vehicle based on the installation package, the software corresponding to the target function.

In a possible implementation, the target request further includes one or more of a validity period of the target function, hardware information of the first vehicle, and the at least one piece of software version information corresponding to the first vehicle.

In a possible implementation, the generation unit is specifically configured to:

generate a device feature code based on the hardware information of the first vehicle;

generate a resource control item and a function control item based on the at least one piece of software version information corresponding to the first vehicle; and generate the target file based on the target service information, the validity period of the target function, the device feature code, the resource control item, and the function control item.

In a possible implementation, the receiving unit is further configured to receive a state of the target function that is sent by the first vehicle, where the state of the target function includes whether the target function is enabled and/or the validity period of the target function.

In a possible implementation, the target file includes a use license file of the target function.

According to a sixth aspect, an embodiment of this application provides a system for obtaining a file based on an OTA technology. The system includes a server and a vehicle. The vehicle is the vehicle according to any implementation of the fourth aspect, and the server is the server according to any implementation of the fifth aspect.

According to a seventh aspect, this application provides an apparatus for obtaining a file based on an OTA technology. The apparatus for obtaining a file based on the OTA technology has a function of implementing the method according to any one of the foregoing method embodiments for obtaining a file based on the OTA technology. The function may be implemented by hardware, or may be implemented by hardware executing corresponding software. The hardware or the software includes one or more modules corresponding to the function.

According to an eighth aspect, this application provides a vehicle. The vehicle includes a processor, and the processor is configured to support the vehicle in performing a corresponding function in the method for obtaining a file based on the OTA technology provided in the first aspect. The vehicle may further include a memory. The memory is coupled to the processor, and the memory stores program instructions and data that are necessary for the vehicle. The vehicle may further include a communications interface that is used for communication between the vehicle and another device or a communications network.

According to a ninth aspect, this application provides a master vehicle control unit. The master vehicle control unit includes a processor, and the processor is configured to support the master vehicle control unit in performing a function corresponding to the master vehicle control unit in the method for obtaining a file based on the OTA technology provided in the third aspect. The master vehicle control unit may further include a memory. The memory is coupled to the processor, and the memory stores program instructions and data that are necessary for the master vehicle control unit. The master vehicle control unit may further include a communications interface that is used for communication between the master vehicle control unit and another device or a communications network.

According to a tenth aspect, this application provides a slave vehicle control unit. The slave vehicle control unit includes a processor, and the processor is configured to support the slave vehicle control unit in performing a function corresponding to the slave vehicle control unit (or the target slave vehicle control unit) in the method for obtaining a file based on the OTA technology provided in the third aspect. The slave vehicle control unit may further include a memory. The memory is coupled to the processor, and the memory stores program instructions and data that are necessary for the slave vehicle control unit. The slave vehicle control unit may further include a communications interface that is used for communication between the slave vehicle control unit and another device or a communications network.

According to an eleventh aspect, this application provides a server. The server includes a processor, and the processor is configured to support the server in performing a corresponding function in the method for obtaining a file based on the OTA technology provided in the second aspect. The server may further include a memory. The memory is coupled to the processor, and the memory stores program instructions and data that are necessary for the server. The server may further include a communications interface used for communication between the server and another device or a communications network.

According to a twelfth aspect, this application provides a computer storage medium, configured to store computer software instructions used by the vehicle in the eighth aspect, and the computer software instructions include a program designed to implement the foregoing aspects.

According to a thirteenth aspect, this application provides a computer storage medium, configured to store computer software instructions used by the server in the eleventh aspect, and the computer software instructions include a program designed to implement the foregoing aspects.

According to a fourteenth aspect, an embodiment of this application provides a computer program, where the computer program includes instructions. When the computer program is executed by a computer, the computer can perform the procedure of the method for obtaining a file based on the OTA technology according to any implementation of the first aspect.

According to a fifteenth aspect, an embodiment of this application provides a computer program, where the computer program includes instructions. When the computer program is executed by a computer, the computer can perform the procedure of the method for obtaining a file based on the OTA technology according to any implementation of the second aspect.

According to a sixteenth aspect, this application provides a chip system. The chip system includes a processor, configured to support a vehicle or a server in implementing a function in the foregoing aspects, for example, receiving or processing data and/or information in the foregoing method.

In a possible design, the chip system further includes a memory. The memory is configured to store program instructions and data that are necessary for a vehicle or a server. The chip system may include a chip, or may include a chip and another discrete component.

BRIEF DESCRIPTION OF DRAWINGS

To describe technical solutions in embodiments of this application or in the background more clearly, the following briefly describes accompanying drawings for describing embodiments of this application or the background.

DESCRIPTION OF EMBODIMENTS

Figure 1:
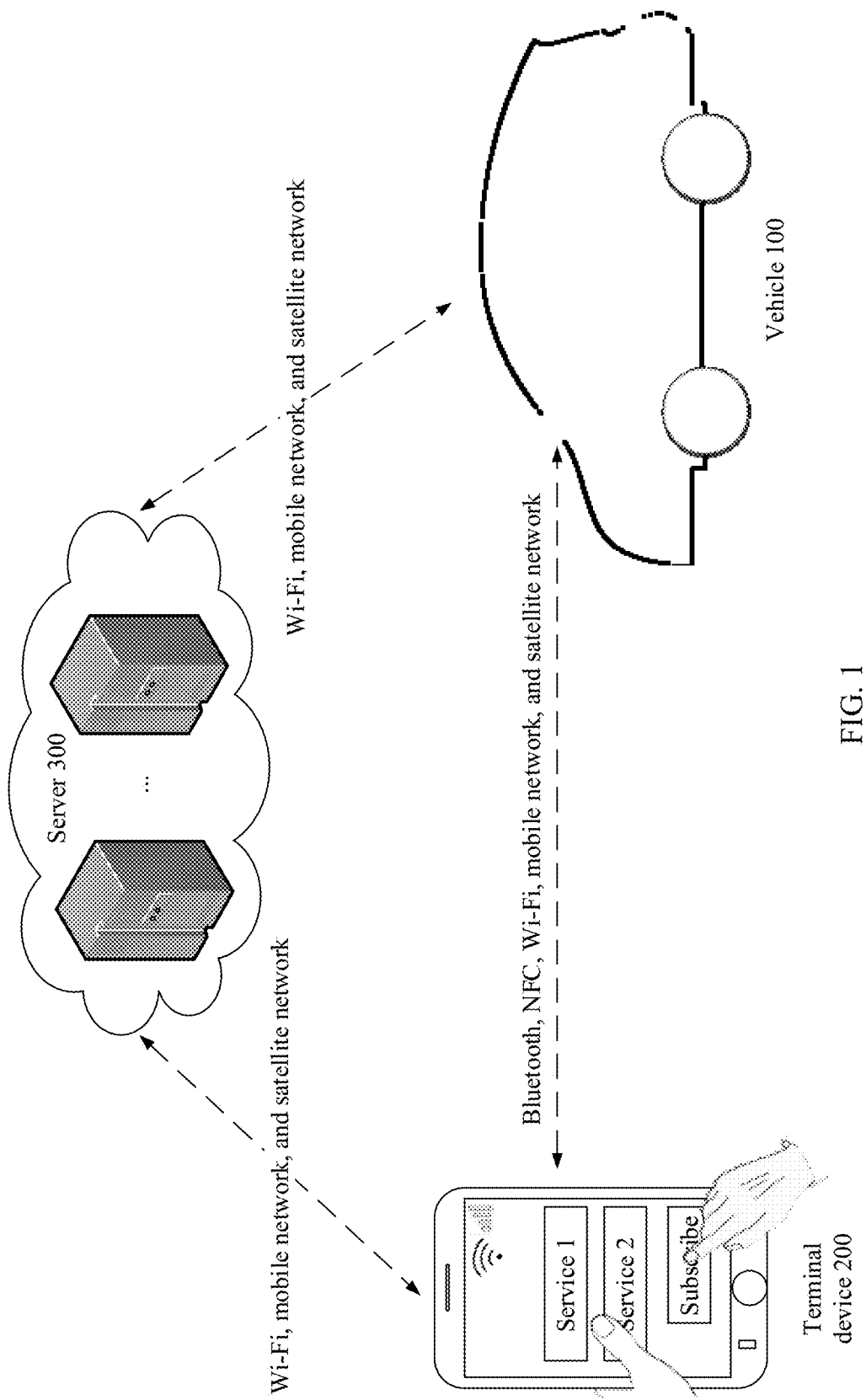
FIG. 1 is a schematic diagram of an application scenario of obtaining a file based on an OTA technology according to an embodiment of this application.

The following describes embodiments of this application with reference to accompanying drawings in embodiments of this application.

In the specification, claims, and the accompanying drawings of this application, the terms "first", "second", "third", "fourth", and the like are intended to distinguish between different objects but do not indicate a particular order. In addition, the terms "include" and "have" and any other variants thereof are intended to cover a non-exclusive inclusion. For example, a process, a method, a system, a product, or a device that includes a series of steps or units is not limited to listed steps or units, but optionally further includes an unlisted step or unit, or optionally further includes another inherent step or unit of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that an embodiment described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both an application that runs on a computing device and the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or a network such as an Internet interacting with another system by using a signal).

Some terms in this application are first described, to help a person skilled in the art has a better understanding.

(1) An over-the-air (OTA) technology is a technology for performing remote firmware or software upgrade through an air interface in mobile communications. OTA has been widely used in network upgrades of devices such as a smart television, a mobile phone, a tablet, and a set-top box. With the development of intelligent connected vehicles, OTA online upgrade has become an important function of the vehicles.

(2) A telematics box (Telematics box), also referred to as a T-Box, is a compound of telecommunications and informatics, and may be literally defined as a service system that provides information by using a computer system built in a vehicle such as an automobile, aircraft, a vessel, or a train, wireless communications technologies, a satellite navigation apparatus, or internet technologies for exchanging information such as a text or voice. In brief, the service system connects a vehicle to an internet via a wireless network, and provides a vehicle owner with various information necessary for driving and living.

(3) An electronic control unit (ECU) is a vehicle-specific microcomputer controller from a perspective of usage. Like a common computer, the electronic control unit includes large-scale integrated circuits such as a microprocessor (CPU), a memory (a ROM or a RAM), an input/output (I/O) interface, an analog-to-digital (A/D) converter, a shaper, and a drive. A slave vehicle control unit in this embodiment of this application is an electronic control unit.

(4) A vehicle control unit (VCU) is an overall vehicle controller of an electric vehicle. The VCU is a powertrain controller of a power system of the electric vehicle, and is responsible for coordination between components such as an engine, a drive motor, a gearbox, and a power battery, and can improve power performance, safety performance, cost-effectiveness, and the like of the vehicle. The VCU is a core part of an overall control system of the electric vehicle and is a core controller configured to control start, operation, advance and retreat, speed, and stop of a motor of the electric vehicle and control another electronic device of the electric vehicle. As a core part of a control system of a battery electric vehicle, the VCU is responsible for tasks such as data exchange, safety management, driver intension interpretation, and power stream management. The VCU collects a signal of a motor control system, a signal of an accelerator pedal, a signal of a brake pedal, and a signal of another part, determines a driving intension of a driver after performing comprehensive analysis and makes a response, and monitors actions of controllers of lower-layer parts. The VCU plays a key role in functions such as normal vehicle driving, battery power braking and regeneration, network management, fault diagnosis and processing, and vehicle status monitoring.

(5) A human machine interface (HMI), also referred to as a human-machine interface or a user interface, is a medium for interaction and information exchange between a system and a user, and implements conversion between an internal form of information and a form acceptable to human beings.

(6) A controller area network (CAN) bus is a most widely applied fieldbus in the world. High reliability and a strong error detection capability of the CAN bus receive much attention, and the CAN bus is widely applied to a vehicle computer control system and an industry environment with a hash ambient temperature, strong electromagnetic radiation, and intense vibration. The CAN bus is a widely applied fieldbus and has a great application prospect in fields such as industrial measurement and control and industrial automation. A CAN is a serial communications bus network. The CAN bus has advantages of being reliable, real-time, and flexible in data communications. For transparent design and flexible execution, a structure of the CAN bus is divided into a physical layer and a data link layer (including a logical link control LLC sub-layer and a media access control MAC sub-layer) according to an ISO/OSI standard model.

(7) A transport layer security (TLS) protocol is used to provide confidentiality and data integrity between two applications. The protocol includes two layers: a TLS record (TLS Record) protocol and a TLS handshake (TLS Handshake) protocol. The transport layer security (TLS) protocol is used to ensure confidentiality and data integrity between two communications applications.

(8) A terminal device may be user equipment (UE), a station (ST) in a wireless local area network (WLAN), a cellular phone, a wireless local loop (WLL) station, a personal digital assistant (PDA) device, a handheld device having a wireless communications function, a computing device or another processing device connected to a wireless modem, a wearable device, or the like.

(9) A license file is used to authorize the use of a service in software and restrict the use of the software, such as a validity period and a maximum number of users. Piracy and illegal use of software have been haunting software product developers. To protect intellectual property rights and prevent piracy and illegal use of software, software protection technologies are used to control unauthorized use of software. At present, a widely used software protection technology is providing a license file for a user, and controlling running of the software by using the license file, so that the software can be used within an authorization scope. In addition, some service function modules or a quantity of resource items that can be loaded can be controlled by using license permission.

For ease of understanding embodiments of this application, the following lists example scenarios to which a method for obtaining a file based on an OTA technology in this application is applied. Three scenarios may be included in the following descriptions.

Scenario 1: A user performs one-to-one management on a vehicle through a terminal device.

Refer to FIG. 1. FIG. 1 is a schematic diagram of an application scenario of obtaining a file based on the OTA technology according to an embodiment of this application. The application scenario includes a terminal device (for example, the terminal device is a smartphone in FIG. 1), a vehicle, and a server. The terminal device and the vehicle may communicate with each other through Bluetooth, NFC, Wi-Fi, a mobile network, and the like, and the server and the terminal device or the vehicle may communicate with each other through Wi-Fi, a mobile network, and the like. A one-to-one matching relationship may be established between the smartphone and the vehicle. For example, a license plate or a unique identifier of the vehicle is matched with an identity card or a valid account of the terminal device. After the matching is completed, the smartphone and the vehicle may cooperate to implement a procedure of the method for obtaining a file based on the OTA technology provided in this application. In this way, the user can subscribe to a service of the vehicle through the smartphone, to meet a customized requirement of the user.

Scenario 2: A user performs one-to-many management on a vehicle through a terminal device.

Figure 2:
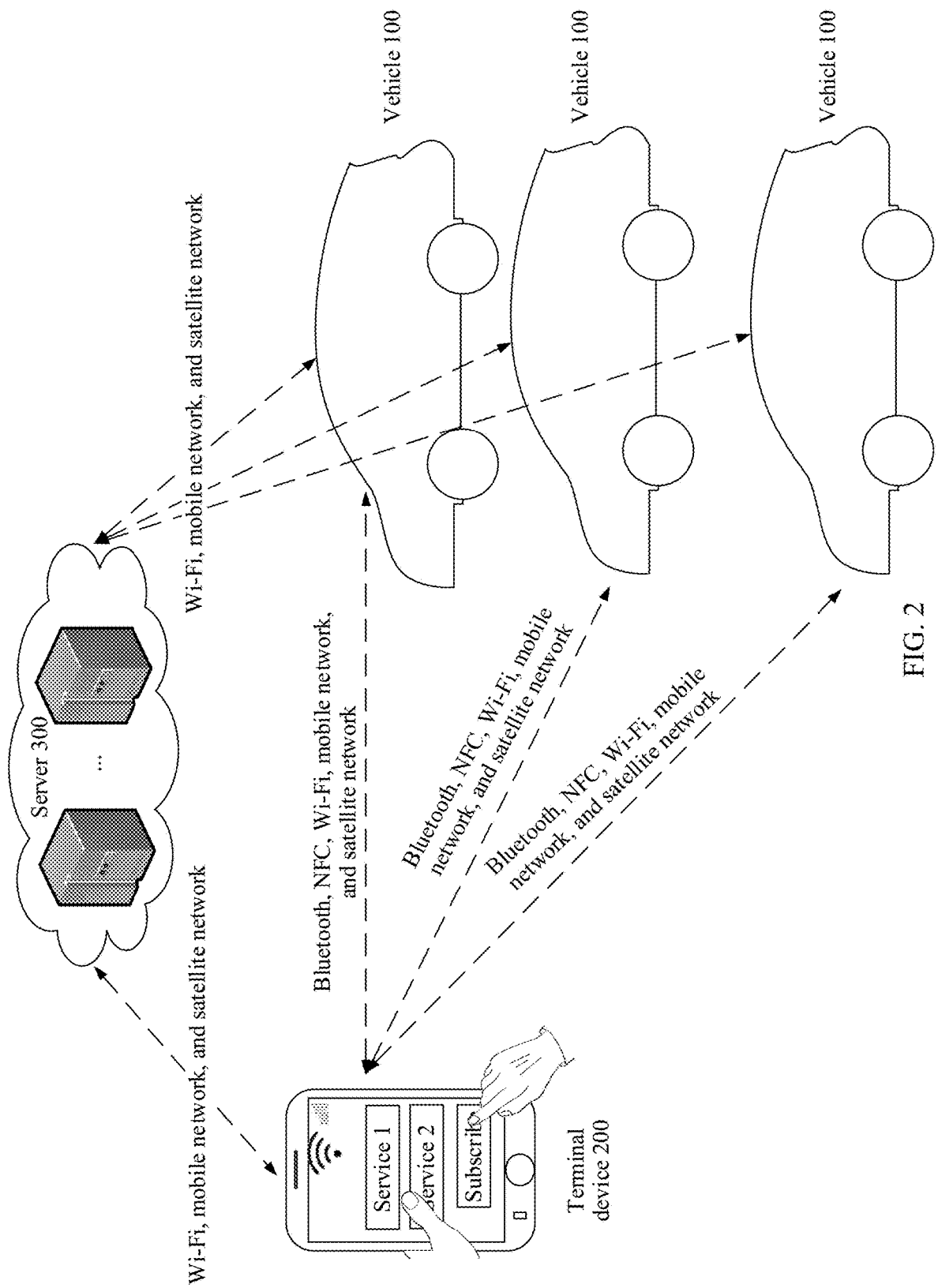
FIG. 2 is a schematic diagram of an application scenario of obtaining a file based on an OTA technology according to an embodiment of this application.

Refer to FIG. 2. FIG. 2 is a schematic diagram of another application scenario of obtaining a file based on the OTA technology according to an embodiment of this application. The application scenario includes a terminal device (for example, the terminal device is a smartphone in FIG. 2), a plurality of vehicles, and a server. For a communications manner in the application scenario, refer to the communications manner in FIG. 1. Details are not described herein again. A one-to-many matching relationship may be established between the smartphone and the vehicles. For example, one user may own and manage a plurality of vehicles at the same time, or one user may manage vehicles of a plurality of different users. For example, an employee in a 4S shop uses a dedicated terminal device to update systems of vehicles of a same model in the shop, or a user uses a terminal device of the user to provide or manage target files for nearby vehicles that have a matching relationship with the terminal device of the user, to implement an application scenario in which one device manages a plurality of vehicles at the same time. This saves time, network transmission bandwidth, and storage resources. It may be understood that, in one-to-many management, the terminal device needs to pre-store related information of the plurality of vehicles, or the plurality of vehicles prove, to the terminal device, authorization of the plurality of vehicles and a service relationship between the plurality of vehicles and the terminal device.

Scenario 3: A user directly performs one-to-one management on a vehicle.

Figure 3:
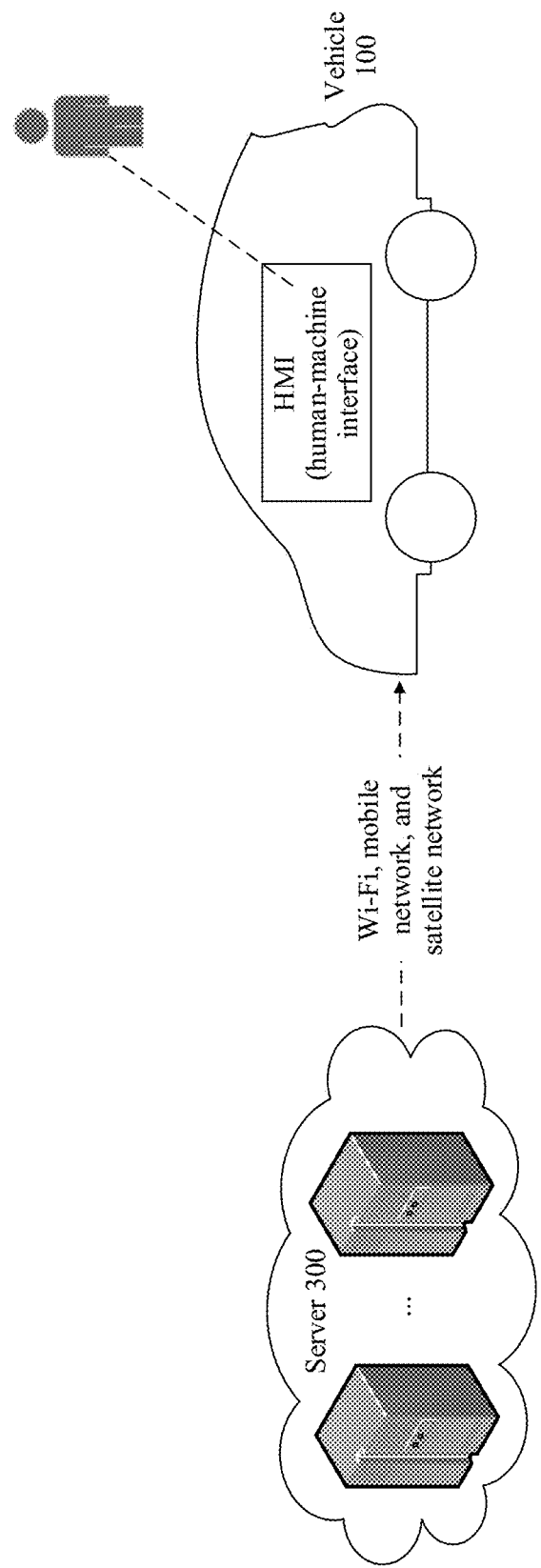
FIG. 3 is a schematic diagram of an application scenario of obtaining a file based on an OTA technology according to an embodiment of this application.

Refer to FIG. 3. FIG. 3 is a schematic diagram of still another application scenario of obtaining a file based on the OTA technology according to an embodiment of this application. The application scenario includes a vehicle and a server. The server may communicate with the vehicle through Wi-Fi, a mobile network, and the like. A user views a new service and subscribes to the service through an HMI of the vehicle, so that the vehicle meets a customized requirement of the user.

It may be understood that the application scenarios in FIG. 1, FIG. 2, and FIG. 3 are merely several example implementations in embodiments of this application, and the application scenarios in embodiments of this application include but are not limited to the foregoing application scenarios.

Figure 4:
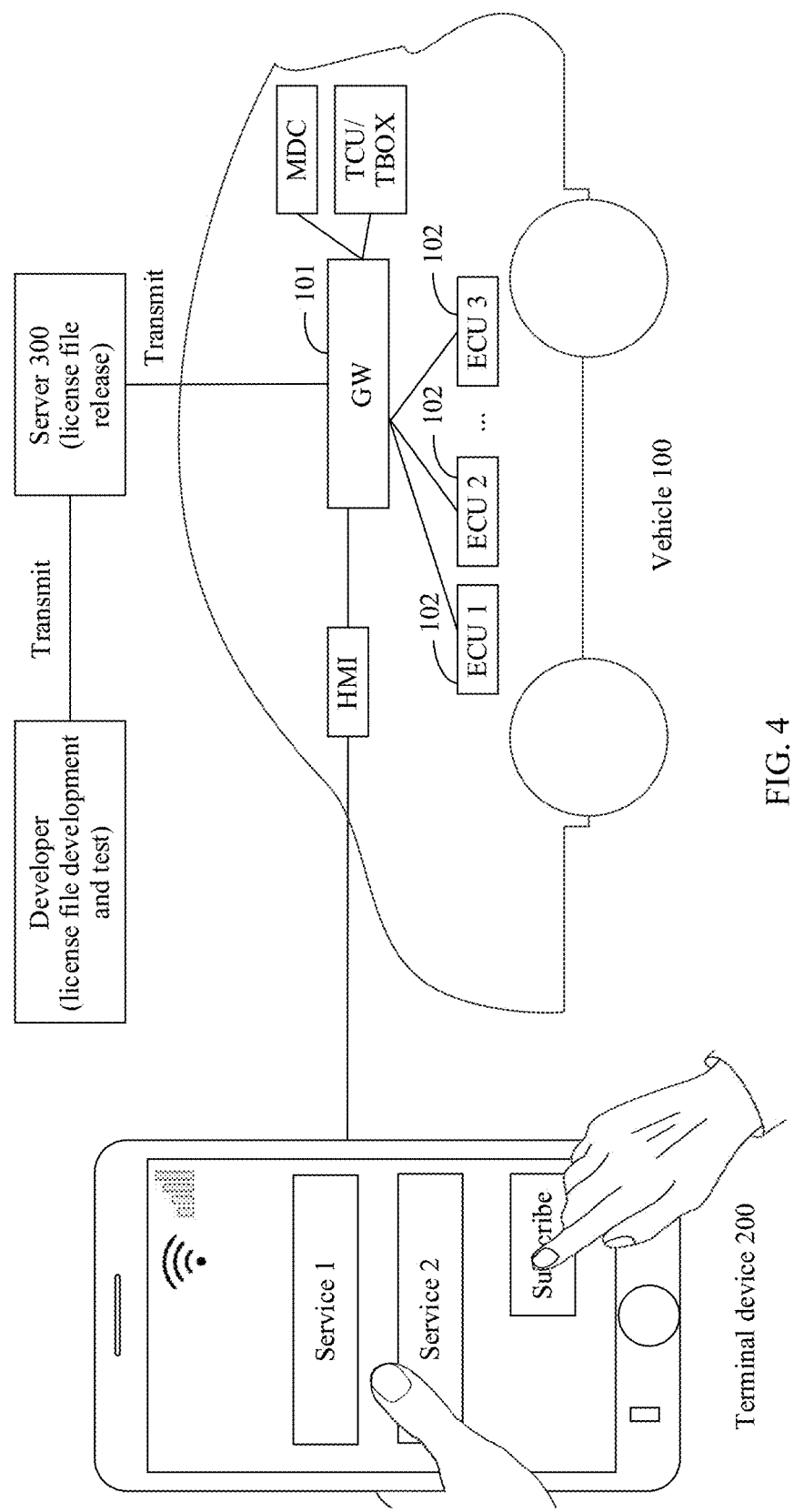
FIG. 4 is a diagram of an architecture of a system for obtaining a file based on an OTA technology according to an embodiment of this application.

With reference to the foregoing application scenario, the following first describes a system architecture on which embodiments of this application are based. Refer to FIG. 4. FIG. 4 is a schematic diagram of an architecture (architecture 1 for short) of a system for obtaining a file based on an OTA technology according to an embodiment of this application. A method for obtaining a file based on the OTA technology provided in this application can be applied to the system architecture. The system architecture includes a server 300, a vehicle 100, and a terminal device 200 (for example, the terminal device is a smartphone in FIG. 4). The vehicle 100 includes a master vehicle control unit (which may also be referred to as an update master or an OTA master) 101 and one or more slave vehicle control units (which may also be referred to as an update slave or an OTA slave) 102. The one or more slave vehicle control units 102 may include an electronic control unit (ECU) 1, an ECU 2, and the like. The master vehicle control unit may be located in a component of the vehicle, for example, a gateway and a telematics box (T-BOX). In the system architecture shown in FIG. 4, an example in which a master vehicle unit is located in a gateway is used. The gateway is a core component in an electronic and electrical architecture of a vehicle. As a data exchange hub of a vehicle network, the gateway may route, between different networks, network data of a controller area network (CAN), a local interconnect network (LIN), media oriented system transport (MOST), FlexRay (namely, a FlexRay vehicle network standard), and the like. The telematics box is mainly used to communicate with the outside of a vehicle, a background system, and a mobile phone application (APP).

The master vehicle control unit 101 is configured to manage and assist implementation of functions of software installed on the plurality of slave vehicle control units 102.

The server 300 may be configured to obtain a target file or an installation package of software from a developer, where the target file may be used by a vehicle to implement a function (or enable a service), and the installation package is used to install software.

The master vehicle control unit 101 is mainly responsible for communicating with a plurality of slave vehicle control units 102 or is responsible for communicating with the terminal device 200 in this application, and a main function of the master vehicle control unit 101 is to manage and assist implementation of a customized function. The master vehicle control unit 101 is a logical entity, and may be physically deployed on any powerful unit or module, for example, a telematics box (also referred to as telematics), a gateway, or a vehicle control unit VCU.

Figure 5:
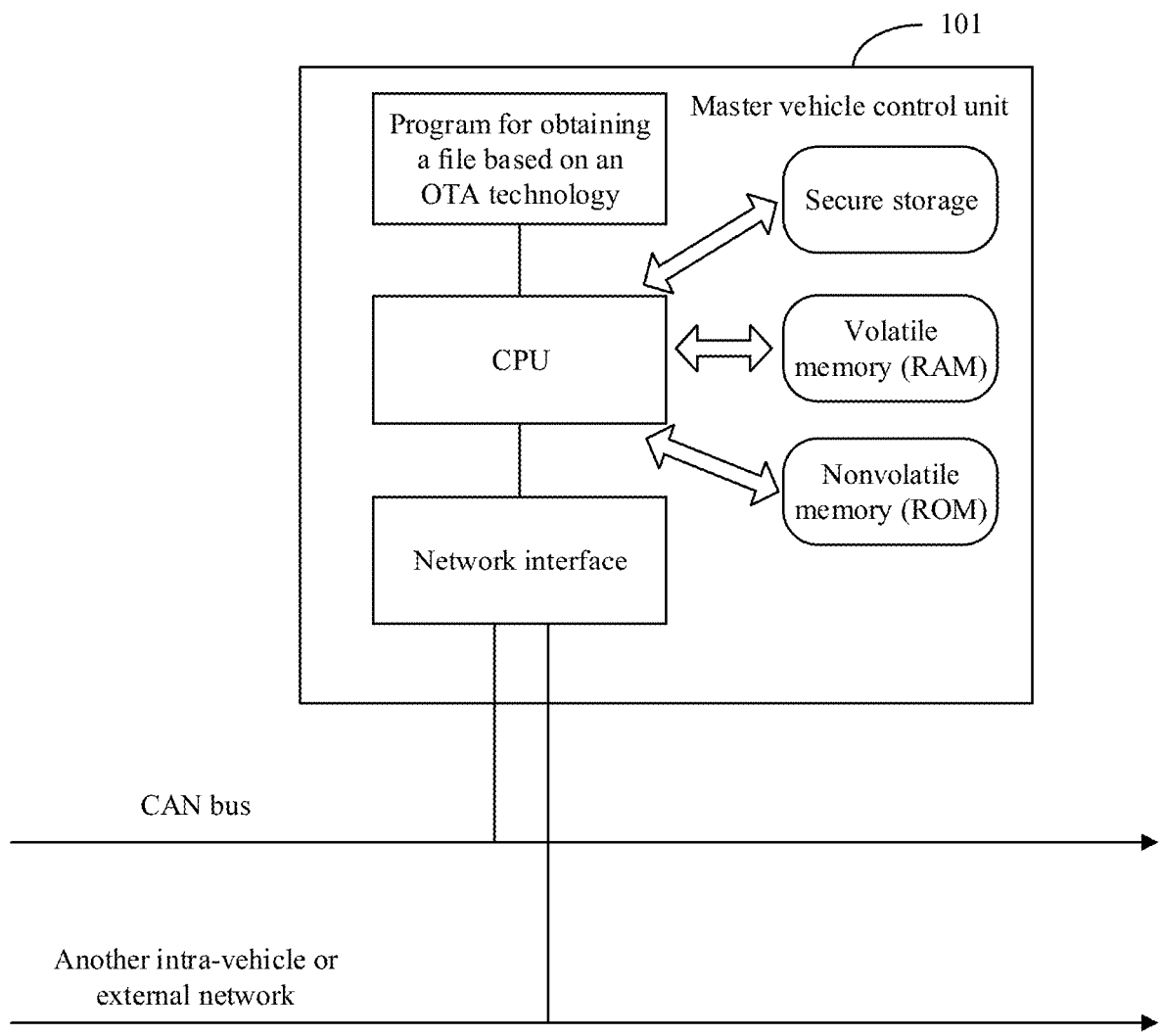
FIG. 5 is a schematic diagram of a structure of a master vehicle control unit according to an embodiment of this application.

A structure of the master vehicle control unit 101 may be that shown in FIG. 5. FIG. 5 is a schematic diagram of a structure of the master vehicle control unit 101 according to an embodiment of this application. The master vehicle control unit 101 may include a processor CPU, a related volatile memory (RAM) and a non-volatile memory (ROM), a memory configured to store a program for obtaining a file based on the OTA technology, and a network interface used for communications with another in-vehicle device through a CAN bus or another intra-vehicle network. It may be understood that, if the master vehicle control unit 101 is implemented on the telematics box, the master vehicle control unit 101 further needs a network interface for communications with an external network. That is, the master vehicle control unit 101 needs to have a strong computing capability and a large quantity of resources to assist the slave vehicle control unit in completing service subscription, and needs to be trusted by another in-vehicle device. In terms of logical architecture division, the master vehicle control unit 101 divides the architecture into a part for external vehicle communications and a part for intra-vehicle communications.

Figure 6:
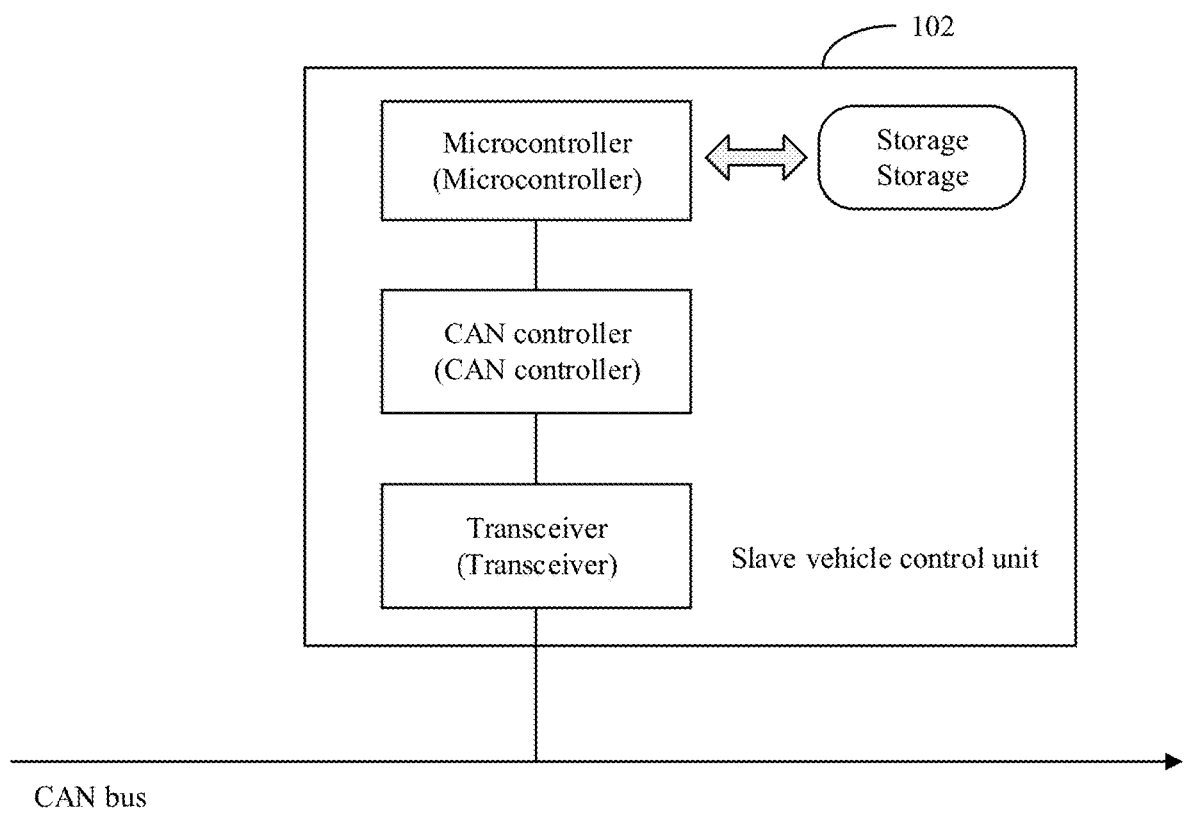
FIG. 6 is a schematic diagram of a structure of a slave vehicle control unit according to an embodiment of this application.

A composition of the slave vehicle control unit 102 or any slave vehicle control unit 102 (including a target slave vehicle control unit in this application) may be that shown in FIG. 6. FIG. 6 is a schematic diagram of a structure of the slave vehicle control unit 102 according to an embodiment of this application. The slave vehicle control unit 102 may include a microcontroller, a CAN controller, and a transceiver. The slave vehicle control unit 102 communicates with an intra-vehicle network such as a CAN bus through a transceiver. The CAN controller is configured to implement a CAN protocol. The microcontroller is configured to implement related computing processing before application and after application, for example, may implement a related procedure in the method executed by the target slave vehicle control unit for obtaining a file based on the OTA technology in this application. With reference to the foregoing schematic structural diagram, in this application, based on the intra-vehicle network, for example, the CAN bus, the slave vehicle control unit 102 receives, through the transceiver a target file sent by the master vehicle control unit 101, and implements a target function based on the target file with the microcontroller. For more specific functions, refer to descriptions of related functions of the target slave control unit 102 in subsequent embodiments.

Figure 7:
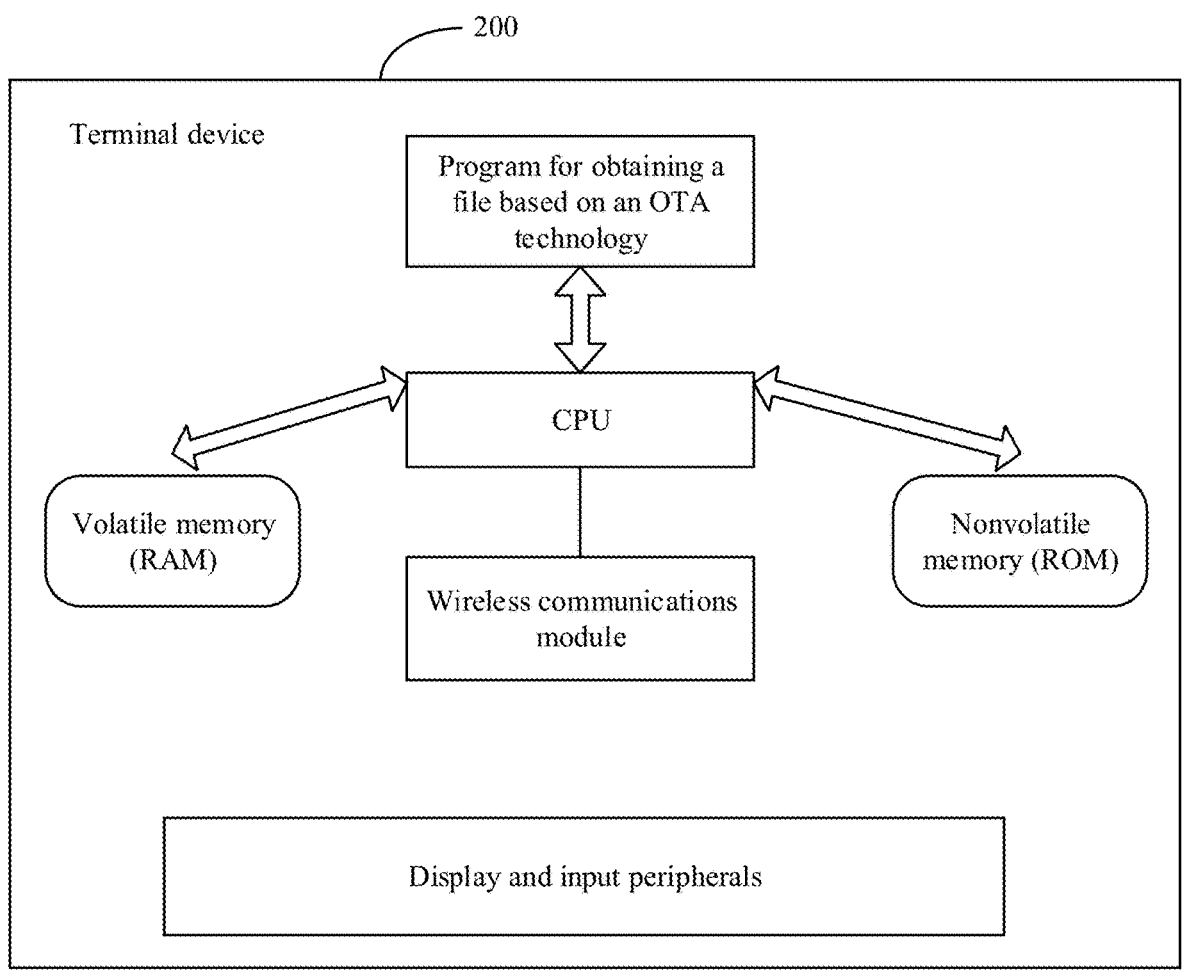
FIG. 7 is a schematic diagram of a structure of a terminal device according to an embodiment of this application.

For composition of the terminal device 200, refer to FIG. 7. FIG. 7 is a schematic diagram of a structure of a terminal device according to an embodiment of this application. The terminal device 200 may include a processor CPU, a related volatile memory RAM and non-volatile memory ROM, a memory configured to store a program for obtaining a file based on an OTA technology, where the program for obtaining a file based on an OTA technology is used to implement vehicle service subscription, a wireless communications module configured to communicate with another device (including a vehicle, an OTA server, and the like), and an audio input/output module, a button or a touch input module, a display, and the like that is configured to provide display and input of an interaction control interface for obtaining a file based on the OTA technology. The terminal device 200 may correspond to the application scenarios in FIG. 1 and FIG. 2.

It may be understood that the system architecture in FIG. 4 is merely an example implementation in embodiments of this application. A communications system architecture in embodiments of this application includes but is not limited to the foregoing communications system architecture.

Figure 8:
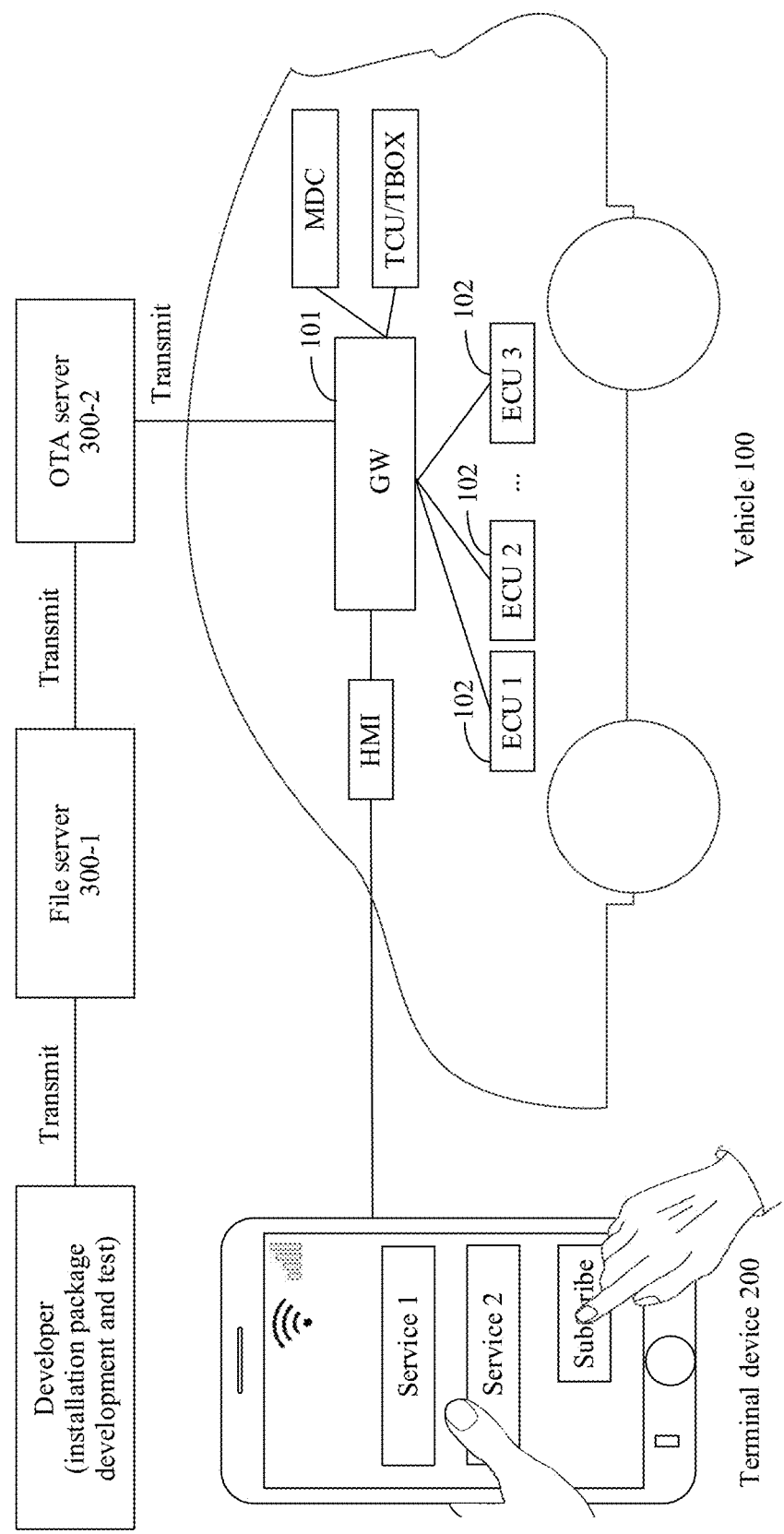
FIG. 8 is a diagram of an architecture of another system for obtaining a file based on an OTA technology according to an embodiment of this application.

Refer to FIG. 8. FIG. 8 is a diagram of another system architecture (an architecture 2 for short) according to an embodiment of this application. A difference from the system architecture provided in FIG. 1 is that a server 300 in this system architecture further includes a file server 300-1 and an OTA server 300-2.

The file server 300-1 is configured to obtain a target file from a developer and send the target file to the OTA server 300-2.

The OTA server 300-2 is configured to receive the target file sent by the file server 300-1, and perform data interaction with a vehicle 100.

It may be understood that for other specific functions of the master vehicle control unit 101 and the plurality of slave vehicle control units 102, refer to descriptions of functional entities or units in the system architecture in FIG. 4. Details are not described herein again.

It may be further understood that the system architecture in this application may further include a developer. After a developed and tested target file is released on firmware/software, the target file is delivered to the file server 300-1 and the OTA server 300-2. A corresponding embodiment is detailed in the following descriptions.

It should be noted that the system architectures in FIG. 4 and FIG. 8 are merely two example implementations in embodiments of this application. A communications system architecture in embodiments of this application includes but is not limited to the foregoing system architectures.

Figure 9:
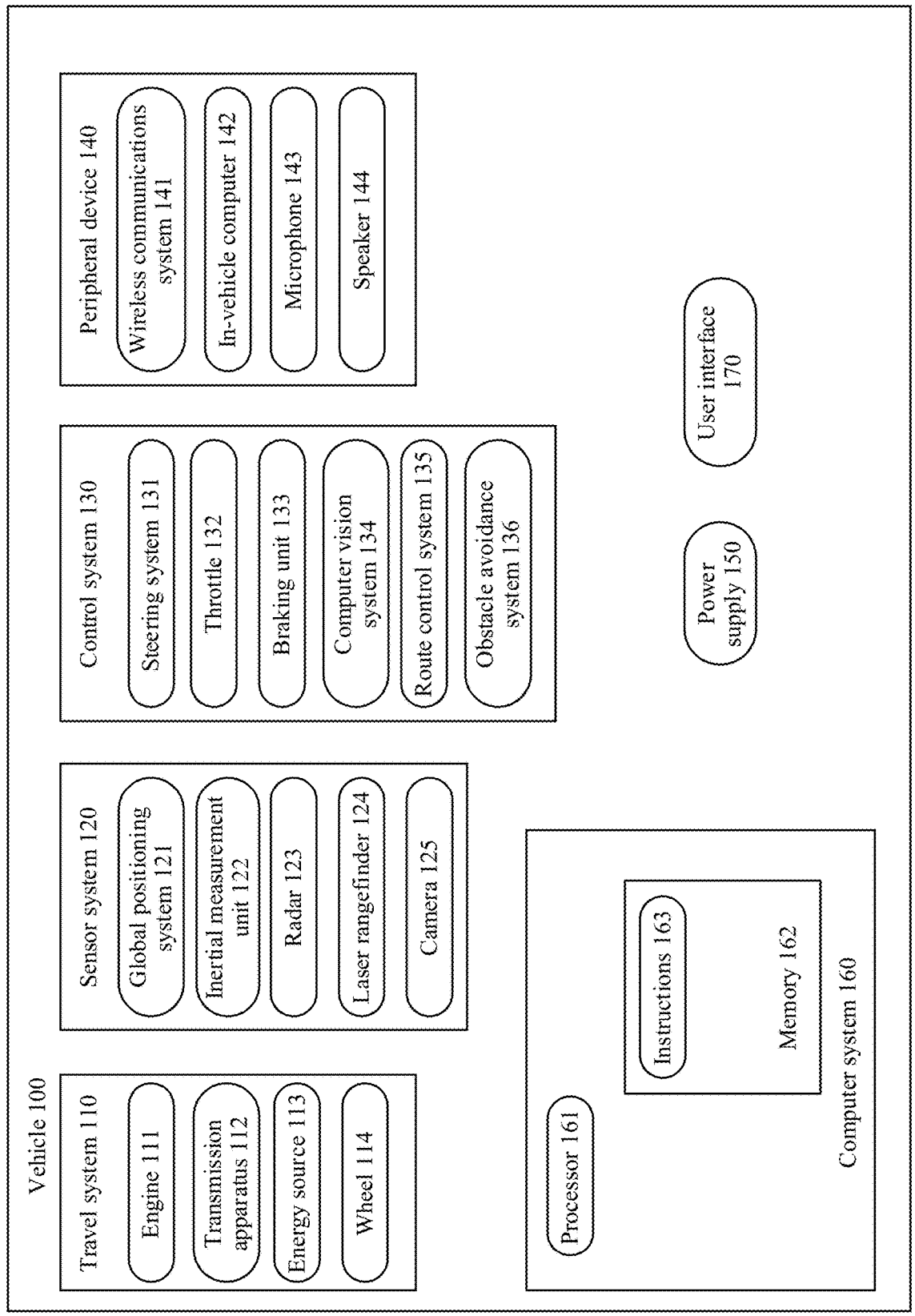
FIG. 9 is a schematic diagram of a structure of a vehicle according to an embodiment of this application.

FIG. 9 is a block diagram of functions of a vehicle 100 according to an embodiment of this application. The vehicle 100 may include various subsystems, such as a travel system 110, a sensor system 120, a control system 130, one or more peripheral devices 140, a power supply 150, a computer system 160, and a user interface 170. Optionally, the vehicle 100 may include more or fewer subsystems, and each subsystem may include a plurality of components. In addition, all the subsystems and components of the vehicle 100 may be interconnected in a wired or wireless manner.

The travel system 110 may include a component that powers the vehicle 100 for movement. In an embodiment, the travel system 110 may include an engine 111, a transmission apparatus 112, an energy source 113, and wheels/tires 114. The engine 111 may be an internal combustion engine, an electric motor, an air compression engine, or a combination of other types of engines, for example, a hybrid engine formed by a gasoline engine and an electric motor, or a hybrid engine formed by an internal combustion engine and an air compression engine. The engine 111 converts the energy source 113 into mechanical energy. Examples of the energy source 113 include gasoline, diesel, another oil-based fuel, propane, another compressed gas-based fuel, ethanol, a solar panel, a battery, and another power source. The energy source 113 may also provide energy to another system of the vehicle 100. The transmission apparatus 112 may transmit mechanical power from the engine 111 to the wheels 114. The transmission apparatus 112 may include a gearbox, a differential, and a drive shaft. In an embodiment, the transmission apparatus 112 may further include another device, for example, a clutch. The drive shaft may include one or more shafts that may be coupled to one or more wheels 114.

The sensor system 120 may include several sensors that sense information about an ambient environment of the vehicle 100. For example, the sensor system 120 may include a positioning system 121 (the positioning system may be a GPS system, or may be a BeiDou system or another positioning system), an inertial measurement unit (inertial measurement unit, IMU) 122, radar 123, a laser rangefinder 124, and a camera 125. The sensor system 120 may further include sensors (for example, an in-vehicle air quality monitor, a fuel gauge, and an oil temperature gauge) of an internal system of the monitored vehicle 100. Sensor data from one or more of these sensors can be used to detect an object and corresponding features (a position, a shape, a direction, a speed, and the like) of the object. Such detection and recognition are key functions of safe operation of the vehicle 100. The positioning system 121 may be configured to estimate a geographical location of the vehicle 100. The IMU 122 is configured to sense, based on an inertial acceleration, a location of the vehicle 100 and a change of a direction that the vehicle 100 faces. In an embodiment, the IMU 122 may be a combination of an accelerometer and a gyroscope. The radar 123 may sense an object in the ambient environment of the vehicle 100 by using a radio signal. In some embodiments, in addition to sensing the object, the radar 123 can be further configured to sense a speed and/or an advancing direction of the object. The laser rangefinder 124 may sense, by using laser, an object in an environment in which the vehicle 100 is located. In some embodiments, the laser rangefinder 124 may include one or more laser sources, a laser scanner, one or more detectors, and other system components. The camera 125 may be configured to capture a plurality of images of the ambient environment of the vehicle 100. The camera 125 may be a static camera or a video camera.

The control system 130 controls operations of the vehicle 100 and components of the vehicle 100. The control system 130 may include various components, including a steering system 131, a throttle 132, a braking unit 133, a computer vision system 134, a route control system 135, and an obstacle avoidance system 136. The steering system 131 is operable to adjust an advancing direction of the vehicle 100. For example, in an embodiment, the steering system 131 may be a steering wheel system. The throttle 132 is configured to control an operating speed of the engine 111, to further control a speed of the vehicle 100. The braking unit 133 is configured to control the vehicle 100 to decelerate. The braking unit 133 may use friction to reduce a rotational speed of the wheels 114. In another embodiment, the braking unit 133 may convert kinetic energy of the wheels 114 into a current. The braking unit 133 may alternatively reduce the rotational speed of the wheels 114 to control the speed of the vehicle 100 in another manner. The computer vision system 134 may be operated to process and analyze an image captured by the camera 125, to recognize an object and/or a feature in the ambient environment of the vehicle 100. The object and/or the feature may include a traffic signal, a road boundary, and an obstacle. The computer vision system 134 may use an object recognition algorithm, a structure from motion (SFM) algorithm, video tracking, and another computer vision technology. In some embodiments, the computer vision system 134 may be configured to: draw a map for an environment, track an object, estimate a speed of an object, and the like. The route control system 135 is configured to determine a traveling route of the vehicle 100. In some embodiments, the route control system 135 may determine the traveling route of the vehicle 100 based on data from the sensor system 120 and one or more predetermined maps. The obstacle avoidance system 136 is configured to recognize, evaluate, and avoid or otherwise cross over a potential obstacle in the environment around the vehicle 100.

Certainly, in an instance, the control system 130 may additionally or alternatively include a component other than those shown and described, or some of the foregoing components may not be included.

The vehicle 100 interacts with an external sensor, another vehicle, another computer system, or a user by using the external device 140. The external device 140 may include a wireless communications system 141, an in-vehicle computer 142, a microphone 143, and/or a speaker 144.

In some embodiments, the external device 140 provides a means for a user of the vehicle 100 to interact with the user interface 170. For example, the in-vehicle computer 142 may provide information for the user of the vehicle 100. The user interface 170 may further operate the in-vehicle computer 142 to receive an input from the user. The in-vehicle computer 142 may perform operations through a touchscreen. In another case, the external device 140 may provide a means for the vehicle 100 to communicate with another device located in the vehicle. For example, the microphone 143 may receive an audio (for example, a voice command or another audio input) from the user of the vehicle 100. Likewise, the speaker 144 may output an audio to the user of the vehicle 100. The wireless communications system 141 may wirelessly communicate with one or more devices directly or through a communications network. For example, the wireless communications system 141 may use 3G cellular communications, for example, code division multiple access (CDMA), evolution-data optimized (EVD) 0, a global system for mobile communications (GSM)/a general packet radio service (GPRS), cellular communications based on the 4th generation mobile communications technology (4G), for example, long term evolution (LTE), or cellular communications based on the 5th generation mobile communications technology (the 5th generation mobile networks, the 5th generation wireless systems, 5th-Generation, or 5G). The wireless communications system 141 may communicate with a wireless local area network (WLAN) through Wi-Fi. In some embodiments, the wireless communications system 141 may directly communicate with a device through an infrared link, Bluetooth, or ZigBee. Other wireless protocols, for example, various vehicle communications systems, such as the wireless communications system 141, may include one or more dedicated short range communications (DSRC) devices, and these devices may include public and/or private data communication between vehicle and/or roadside stations.

The power supply 150 may provide power to various components of the vehicle 100. In an embodiment, the power supply 150 may be a rechargeable lithium-ion or lead-acid battery. One or more battery packs of such batteries may be configured as the power supply to supply power to the components of the vehicle 100. In some embodiments, the power supply 150 and the energy source 113 may be implemented together, as in some battery electric vehicles.

Some or all of functions of the vehicle 100 are controlled by the computer system 160. The computer system 160 may include at least one processor 161. The processor 161 executes instructions 163 stored in a non-transitory computer-readable medium such as a data storage apparatus 162. The computer system 160 may be a plurality of computing devices that control an individual component or a subsystem of the vehicle 100 in a distributed manner.

The processor 161 may be any conventional processor, such as a commercially available central processing unit (CPU). Optionally, the processor may be a dedicated device such as an application-specific integrated circuit (ASIC) or another hardware-based processor. Although FIG. 9 functionally illustrates other components of the processor, the memory, and the computer system 160 in a same block, a person of ordinary skill in the art should understand that the processor, the computer system, or the memory may actually include a plurality of processors, computers, or memories that may or may not be stored in a same physical housing. For example, the memory may be a hard disk drive or another storage medium located in a housing different from that of the computer system 160. Thus, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the memory 162 may include the instructions 163 (for example, program logic), and the instructions 163 may be executed by the processor 161 to perform various functions of the vehicle 100, including the functions described above. The memory 162 may also include additional instructions, including instructions to send data to, receive data from, interact with, and/or control one or more of the travel system 110, the sensor system 120, the control system 130, and the peripheral device 140.

In addition to the instructions 163, the data storage apparatus 162 may further store data, for example, an installation package of software, a target file, and other information. The information may be used by the vehicle 100 and the computer system 160 when software is installed on the vehicle 100 or a target function is implemented.

The user interface 170 is configured to provide information to or receive information from the user of the vehicle 100. Optionally, the user interface 170 may be included in one or more input/output devices in a set of the peripheral devices 140, for example, the wireless communications system 141, the in-vehicle computer 142, the microphone 143, and the speaker 144.

The computer system 160 may control the functions of the vehicle 100 based on an input received from various subsystems (for example, the travel system 110, the sensor system 120, and the control system 130) and from the user interface 170. For example, the computer system 160 may generate a target request by using target service information from an external device 108. In some embodiments, the computer system 160 is operable to provide control over many aspects of the vehicle 100 and the subsystems of the vehicle 100.

Optionally, one or more of the foregoing components may be separated from or associated with the vehicle 100. For example, the memory 162 may be partially or totally separated from the vehicle 100. The foregoing components may be communicatively coupled in a wired and/or wireless manner.

Optionally, the foregoing components are merely examples. In actual application, components in the foregoing modules may be added or removed based on an actual requirement. FIG. 9 should not be construed as a limitation on embodiments of this application.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

The master vehicle control unit 101 and the slave vehicle unit 102 in this embodiment of this application may be separately located in any subsystem of the vehicle 100 shown in FIG. 9.

First, a to-be-resolved technical problem and an application scenario in this application are proposed. In related technologies, firmware/software upgrade of a conventional in-vehicle device requires recall of a vehicle. To be specific, the vehicle is recalled to a specified location such as a vehicle repair shop or a 4S shop, to upgrade firmware/software by using the following methods. The following solution 1 and solution 2 are specific implementations.

Solution 1: By using a joint test action group (JTAG) interface or a background debug mode (BDM) interface, perform on-line burning or perform burning after an in-vehicle device is disassembled. Specifically, a manner 1 and a manner 2 may be included.

Manner 1: First download to-be-upgraded software to a burner by using a personal computer (PC), connect the burner to burning tooling, place a printed circuit board (PCB) of a vehicle electronic control system in the burning tooling, align the printed circuit board with a download interface, and perform burning on the software when the burner is powered on.

Manner 2: Connect program download data cables of a PC and a single-chip microcomputer to a PCB of a vehicle electronic control system in series, and operate the PC to directly download a program to the single-chip microcomputer.

The foregoing manner 1 and manner 2 have problems of requiring a skilled person, high costs, and inconvenient operation.

Solution 2: Perform flash burning based on an on-board diagnostic (OBD) system of a CAN bus.

Step 1: Enter a refresh mode from a normal application running state of a vehicle electronic system (trigger interruption or diagnosis).

Step 2: Check a memory of a vehicle electronic controller chip, and determine whether a correct application is stored in the memory.

Step 3: If there are no correct applications in the memory, download application software from a diagnostic device, transmit the application software through the CAN bus, and refresh an application in a flash (a refresh module is configured to start and guide software writing).

The solution 2 has problems of requiring a skilled person and a long cycle.

Figure 10:
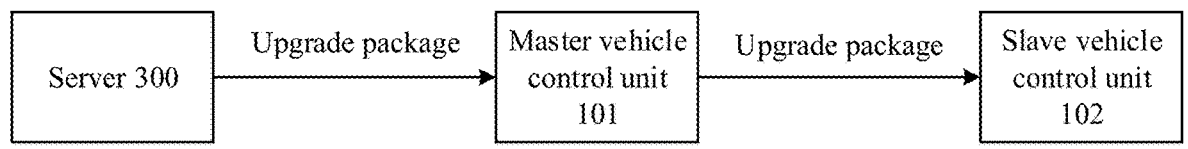
FIG. 10 is a diagram of an OTA upgrade architecture in a related technology according to an embodiment of this application.

In addition to the foregoing solution 1 and solution 2, remote upgrade can be applied to some vehicles currently. For example, as shown in FIG. 10, an original equipment manufacturer (OEM) periodically and collectively upgrades all pieces of related vehicle firmware/software. An OTA server signs an upgrade package, and delivers a signed upgrade package through a transport layer security (TLS) secure channel or the like. A master vehicle control unit downloads the upgrade package through the TLS secure channel, performs signature verification on the upgrade package, disassembles the upgrade package, and distributes the package to a corresponding slave vehicle control unit. The slave vehicle control unit receives the upgrade package from the master vehicle control unit. The master vehicle control unit prompts each slave vehicle control unit to install the upgrade package based on a specific dependency relationship and a specific sequence, to complete remote software upgrade. The vehicle includes a plurality of components. OTA upgrade of the entire vehicle involves upgrade of the plurality of components, and a master vehicle control unit (or referred to as an OTA master module) is required to coordinate upgrade of the components. The master vehicle control unit runs on a component (such as a GW or T-box) of the vehicle, and coordinates and controls an upgrade module of another components (a slave vehicle control unit, or an OTA slave module) to complete upgrade of the entire vehicle.

However, when the vehicle needs to implement a specific service function, the vehicle needs to obtain a file corresponding to the service function from an external dedicated file server. In addition, because the vehicle includes a plurality of components, and each component may be installed with a plurality of pieces of software implementing different service functions, managing files corresponding to different service functions of the vehicle by the file server is complex and inefficient. For example, a use license file (a file used for software protection) may be used to enable a service function of a vehicle. A server provides a target file for a user, and the target file controls running of software, so that the software is used within an authorization scope. In this way, the vehicle implements a customized function. Generation, delivery, and management of target files of the entire vehicle are completed by a dedicated license server. Due to a complex internal structure of the vehicle, various service function modules, and different resource permission, management of target files of the entire vehicle is complex.

With reference to embodiments of the method for obtaining a file based on an OTA technology provided in this application, the following analyzes and resolves the technical problem proposed in this application.

Figure 11A:
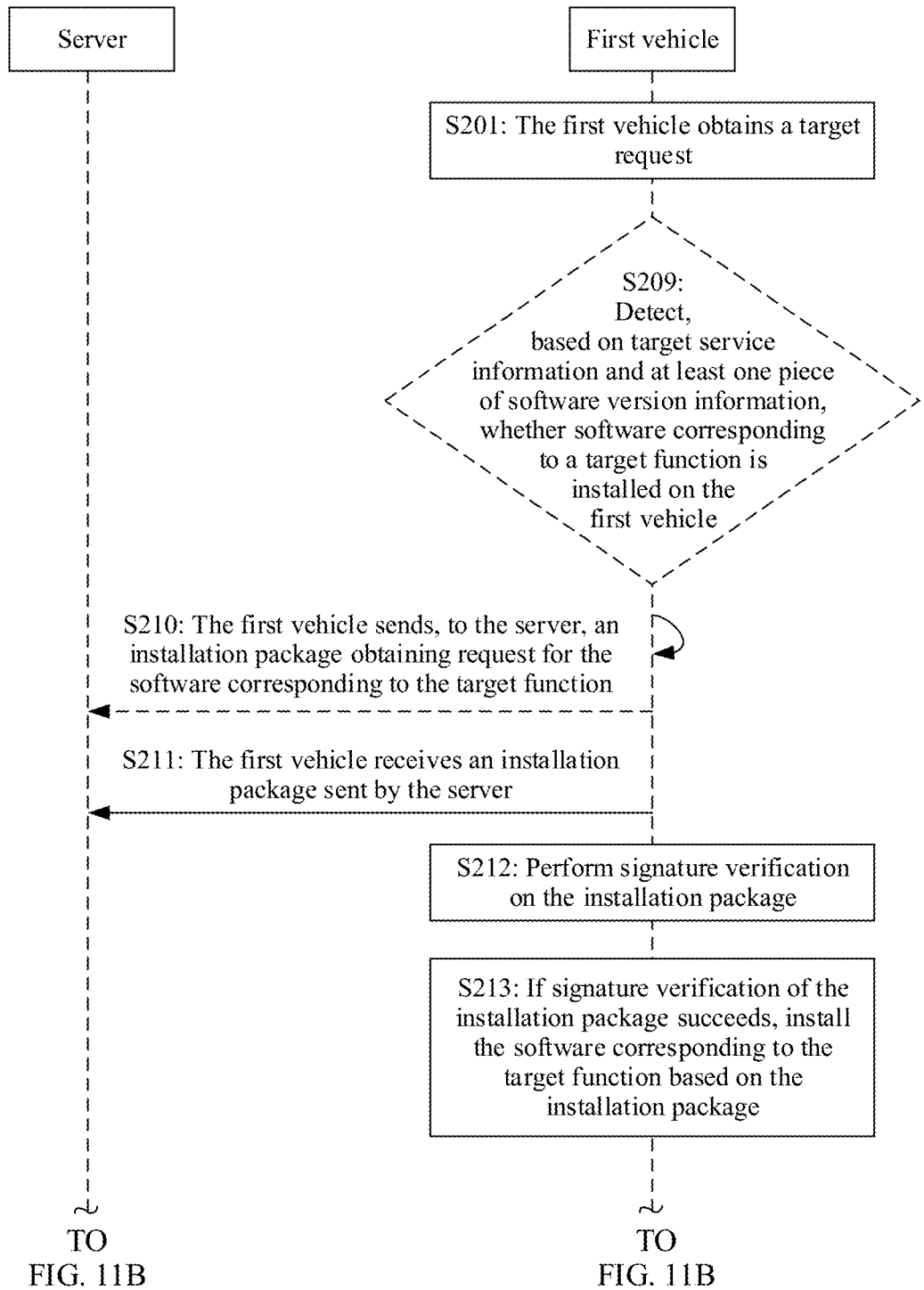
FIG. 11A and FIG. 11B are a schematic flowchart of a method for obtaining a file based on an OTA technology according to an embodiment of this application.
Figure 11B:
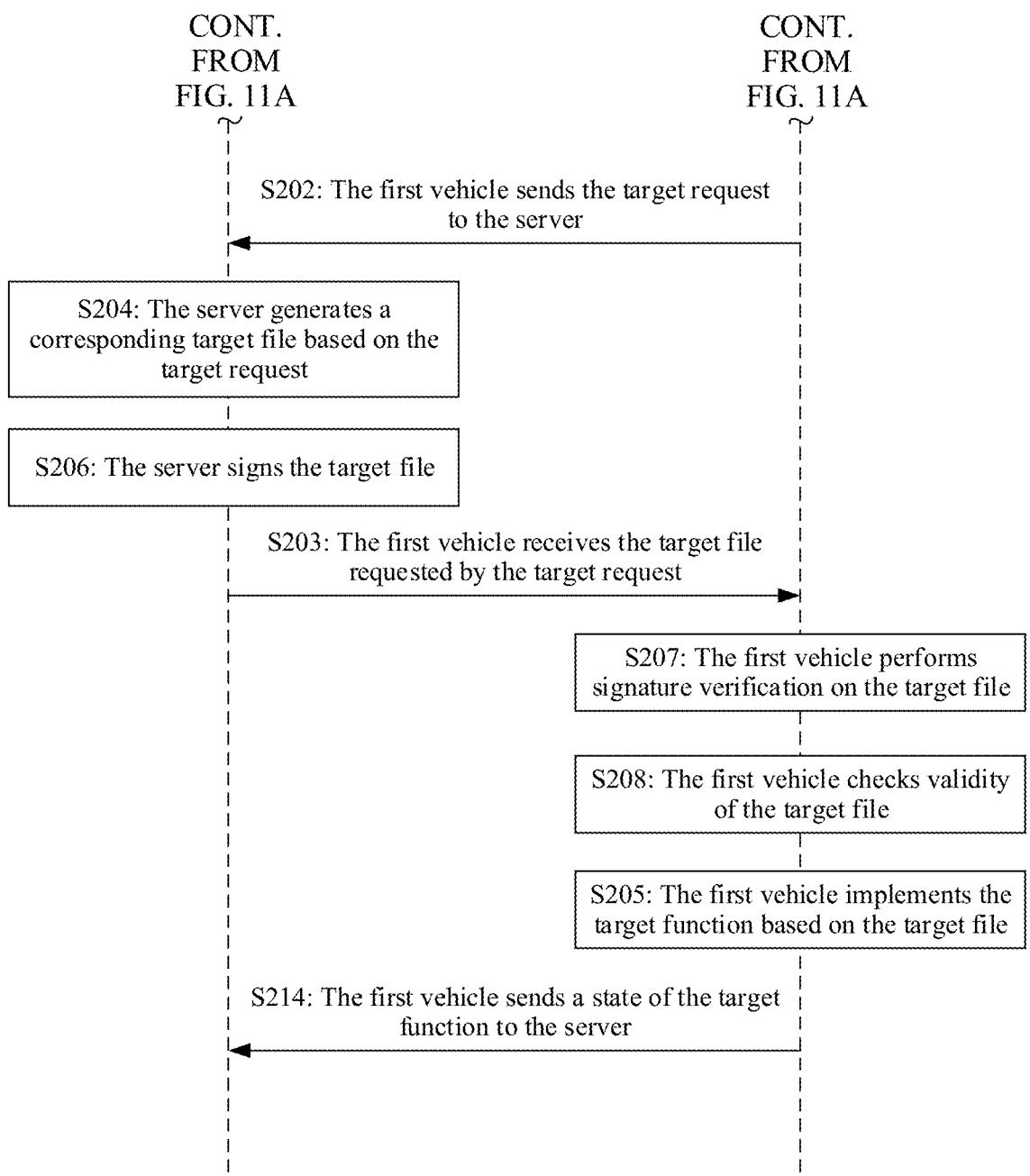

Refer to FIG. 11A and FIG. 11B. FIG. 11A and FIG. 11B are a schematic flowchart of a method for obtaining a file based on an OTA technology according to an embodiment of this application. The method may be applied to the system architecture in FIG. 4 or FIG. 8. With reference to FIG. 11A and FIG. 11B, the following provides descriptions from a perspective of interaction between a server and a first vehicle. The server, the first vehicle, and a terminal device in this embodiment of this application may be the server 300, the vehicle 100, and the terminal device 200 described in FIG. 1 to FIG. 10. The method may include the following steps S201 to S203.

S201: The first vehicle obtains a target request, where the target request includes target service information, and the target service information is used to obtain a target file associated with a target function.

Specifically, the first vehicle further includes a human-machine interface HMI, and the first vehicle may receive the target service information through the HMI. The target function may be a to-be-enabled service function applied for by the first vehicle. The target service information describes a to-be-enabled service function applied for by the first vehicle. For example, the target service information includes a service identifier.

S202: The first vehicle sends the target request to the server.

Correspondingly, the server receives the target request sent by the first vehicle.

Before the first vehicle exchanges data with the server, the first vehicle and the server may perform configuration, for example, configure a certificate and a private key. Based on configuration information, a secure channel is established between the first vehicle and the server, for example, a Hyper Text Transfer Protocol over Secure Socket Layer (HTTPs) secure channel, a Transport Layer Security (TLS) secure channel, or a Datagram Transport Layer Security (DTLS) secure channel. In this way, information can be securely transmitted between the first vehicle and the server.

Optionally, the first vehicle sends the target request to the server based on an OTA technology. Sending the target request to the server based on the OTA technology may be understood as that the first vehicle sends the target request to the server by reusing an OTA remote upgrade channel between the server and the first vehicle.

S203: The first vehicle receives the target file requested by the target request, where the target file is used to indicate the first vehicle to implement the target function.

Correspondingly, when receiving the target request sent by the first vehicle, the server may generate a corresponding target file based on the target request, and send the target file to the first vehicle.

Optionally, the first vehicle may receive, based on the OTA technology, the target file requested by the target request. Receiving, based on the OTA technology, the target file requested by the target request may be understood as the first vehicle receiving the target file by reusing the OTA remote upgrade channel between the server and the first vehicle.

In related technologies, when the vehicle needs to implement a specific service function, the vehicle needs to obtain a file corresponding to the service function from an external dedicated file server. Because the vehicle includes a plurality of components, and each component may be installed with a plurality of pieces of software implementing different service functions, managing files corresponding to different service functions of the vehicle by the file server are complex and inefficient. In this embodiment of this application, according to a related OTA technology, when a vehicle performs OTA remote firmware/software upgrade, a remote upgrade channel is established between a server and the vehicle (including a master vehicle control unit and one or more slave vehicle units). The master vehicle control unit has features of managing hardware information of each slave vehicle control unit and software version information corresponding to at least one piece of software installed on each slave vehicle control unit, and distributing an upgrade package for software on each slave vehicle control unit. After receiving the target request including the target service information, the vehicle initiates a related request to the server by reusing the OTA remote upgrade channel between the server and the vehicle, and receives, based on the OTA technology, the target file that is associated with the target function and that is sent by the server, to implement the target function based on the target file. In this way, a service-associated file can be obtained based on the OTA technology. In conclusion, in this application, the OTA remote upgrade channel between the server and the vehicle is reused, to avoid complex function-associated file management caused by a need to create a file management channel and a need to use a dedicated file server to complete generation, delivery, and management of function-associated files of the entire vehicle. In addition, the user may purchase a corresponding service for the vehicle based on a customized requirement. A customized requirement of the user can be met, purchase costs can be reduced, and user experience can be improved.

In a possible implementation, the method further includes the following steps.

S204: The server generates the corresponding target file based on the target request.

Specifically, after receiving the target request sent by the first vehicle, the server generates, based on the target request, the target file corresponding to the target function.

The server in this embodiment of this application may include an OTA server and a file server. The server may generate the corresponding target file based on the target request in the following manners. For example, when receiving the target request sent by the first vehicle, the OTA server directly generates the corresponding target file based on the target request; or when receiving the target request sent by the first vehicle, the OTA server forwards the target request to another file server, and the file server generates the corresponding target file based on the target request, and then sends the generated target file to the OTA server. Then the OTA server sends the generated target file to the first vehicle.

In a possible implementation, the method further includes the following steps.

S205: The first vehicle implements the target function based on the target file.

Before implementing the target function based on the target file, the first vehicle may further detect whether software corresponding to the target function is installed on the first vehicle. When detecting that the software corresponding to the target function is installed on the first vehicle, the first vehicle implements the target function based on the target file. If it is detected that the software corresponding to the target function is not installed on the first vehicle, the software corresponding to the target function needs to be first installed, and then the target function is implemented based on the target file.

In a possible implementation, the method further includes the following steps.

S206: The server signs the target file.

S207: The first vehicle performs signature verification on the target file.

If signature verification of the target file succeeds, the first vehicle performs step S205, that is, implements the target function based on the target file.

Specifically, before sending the target file to the first vehicle, the server may perform security processing on the target file. The security processing may be signature processing, encryption processing, other security processing, or the like, to prevent unauthorized modification on the target file. In this embodiment of this application, when the signed target file obtained from the outside of the vehicle is verified, the first vehicle implements the target function based on the target file inside the vehicle, to ensure security of vehicle service enabling.

In a possible implementation, the method further includes the following step:

S208: The first vehicle checks validity of the target file.

If validity check of the target file succeeds, the first vehicle performs step S205, that is, implements the target function based on the target file. Specifically, if signature verification of the target file succeeds, the first vehicle may further check validity of the target file, and if validity check of the target file succeeds, the first vehicle implements the target function based on the target file. When receiving the target file sent by the server, the first vehicle may first perform signature verification on the target file. If signature verification of the target file succeeds, the target file is imported, and a unique identification field of hardware information of the first vehicle is read and compared with a unique identification field included in the target file, to determine whether the target file is valid. If the unique identification field in the hardware information of the first vehicle is consistent with or matches the unique identification field included in the target file, validity check of the target file succeeds. If the unique identification field in the hardware information of the first vehicle is inconsistent with or does not match the unique identification field included in the target file, validity check of the target file fails. In this embodiment of this application, when validity of the target file obtained from the outside of the first vehicle is checked, the first vehicle implements the target function based on the target file. In this way, a situation in which the target function cannot be implemented because the received target file is not the target file corresponding to the target function can be avoided, and efficiency and security of vehicle service enabling can be ensured.

In a possible implementation, the target request further includes the hardware information of the first vehicle, the target file includes a device feature code generated based on the hardware information, and that the first vehicle checks validity of the target file includes:

The first vehicle determines whether the hardware information matches the device feature code; and if the hardware information matches the device feature code, determines that the target file is a valid file.

In this embodiment of this application, when validity of the target file obtained from the outside of the vehicle is checked, the first vehicle implements the target function based on the target file. In this way, a situation in which the target function cannot be implemented because the received target file is not the target file corresponding to the target function can be avoided, and efficiency and security of vehicle service enabling can be ensured.

In a possible implementation, the target file includes a use license file of the target function.

Content of the license file may include a software manufacturer, a product name, a product version, a device feature code, an expiry date, a resource control item, a function control item, a signature, and the like. The license file includes some control policies (for example, a license control item) used to control running of software. The device feature code, the expiry date, the resource control item, and the function control item included in the target file are license control items. A license technology can be used to flexibly control software functions and a quantity of available resources. After validity check of the target file succeeds, the first vehicle may run the software based on the control item of the target file, to implement the target function corresponding to the software.

Optionally, when the first vehicle obtains the service information of the target function, the first vehicle or the server determines whether the software corresponding to the target function is installed on the first vehicle, that is, whether an installation package of the software corresponding to the target function needs to be downloaded. The foregoing embodiment is implemented when the first vehicle or the server determines that the software corresponding to the target function is installed on the first vehicle. The following describes, with reference to steps S209 to S213, an operation that needs to be performed by the server or the first vehicle if it is determined that the software corresponding to the target function is not installed on the first vehicle. Optionally, step S209 to step S213 indicate that determining whether the software corresponding to the target function is installed on the first vehicle is performed by the first vehicle. Optionally, when determining whether the software corresponding to the target function is installed on the first vehicle is performed by the server, the target request further includes at least one piece of software version information corresponding to the first vehicle. In this case, step S209 and step S210 do not need to be performed. The method may include the following steps S211 to S213.

In a possible implementation, the first vehicle determines whether the software corresponding to the target function is installed on a target slave vehicle control unit. The method further includes:

S209: The first vehicle detects, based on the target service information and at least one piece of software version information corresponding to the first vehicle, whether software corresponding to the target function is installed on the first vehicle.

In a possible implementation, the method further includes:

S210: If the software corresponding to the target function is not installed on the first vehicle, the first vehicle sends, to the server, an installation package obtaining request for the software corresponding to the target function.

The installation package obtaining request may include a software identifier, software version information, and the hardware information of the first vehicle.

In a possible implementation, the method further includes:

S211: The first vehicle receives the installation package sent by the server.

Specifically, when receiving the installation package obtaining request sent by the first vehicle, the server may obtain the installation package from the developer, and perform security processing such as signature or encryption on the installation package, to prevent unauthorized modification on the installation package.

S212: The first vehicle performs signature verification on the installation package.

S213: If signature verification of the installation package succeeds, the software corresponding to the target function is installed on the first vehicle based on the installation package.

When the software corresponding to the target function is installed on the first vehicle, the first vehicle implements the target function based on the software and the target file.

In a possible implementation, the target request further includes the at least one piece of software version information corresponding to the first vehicle. In this case, the method includes the foregoing steps S211 to S213. To be specific, when the target request further includes the at least one piece of software version information corresponding to the first vehicle, the server detects, based on the target service information and the software version information, whether the software corresponding to the target function is installed on the first vehicle. If the server detects, based on the target service information and the software version information, that the software corresponding to the target function is not installed on the first vehicle, the server sends, to the first vehicle, the installation package of the software corresponding to the target function, and the first vehicle receives the installation package corresponding to the target function and performs signature verification on the installation package. If signature verification of the installation package succeeds, the software corresponding to the target function is installed on the first vehicle based on the installation package, and the target function is implemented based on the software and the target file.

In a possible implementation, the first vehicle includes a master vehicle control unit and one or more slave vehicle control units, and the target function is a function implemented by a target slave vehicle control unit in the one or more slave vehicle control units. That the first vehicle receives the target file requested by the target request includes:

The master vehicle control unit receives the target file requested by the target request; and the master vehicle control unit sends the target file to the target slave vehicle control unit, where the target file is used to indicate the target slave vehicle control unit to implement the target function based on the target file.

When the first vehicle includes a master vehicle control unit and one or more slave vehicle control units, for operations performed by the master vehicle control unit and the one or more slave vehicle control units, refer to descriptions of related steps in the embodiments corresponding to FIG. 12A to FIG. 15B. Details are not described herein again.

In a possible implementation, the first vehicle further includes a human-machine interface, and that the first vehicle obtains a target request includes: The first vehicle obtains the target request through the human-machine interface.

In a possible implementation, the method further includes:

S214: The first vehicle sends a state of the target function to the server.

The state of the target function includes whether the target function is implemented and/or a validity period of the target function.

Specifically, the first vehicle may periodically send the state of the target function to the server, so that the server can manage the delivered target file. In addition, the first vehicle displays the state of the target function to the user, so that the user learns of a usage state of the target function, the validity period of the target function, and the like through the HMI of the first vehicle.

In a possible implementation, the target request further includes one or more of the validity period of the target function, the hardware information of the first vehicle, and the at least one piece of software version information corresponding to the first vehicle; and the target file is generated by the server based on one or more of the target service information, the validity period of the target function, the hardware information, and the at least one piece of software version information.

Optionally, the target request may further include an identification code of the vehicle.

Figure 12A:
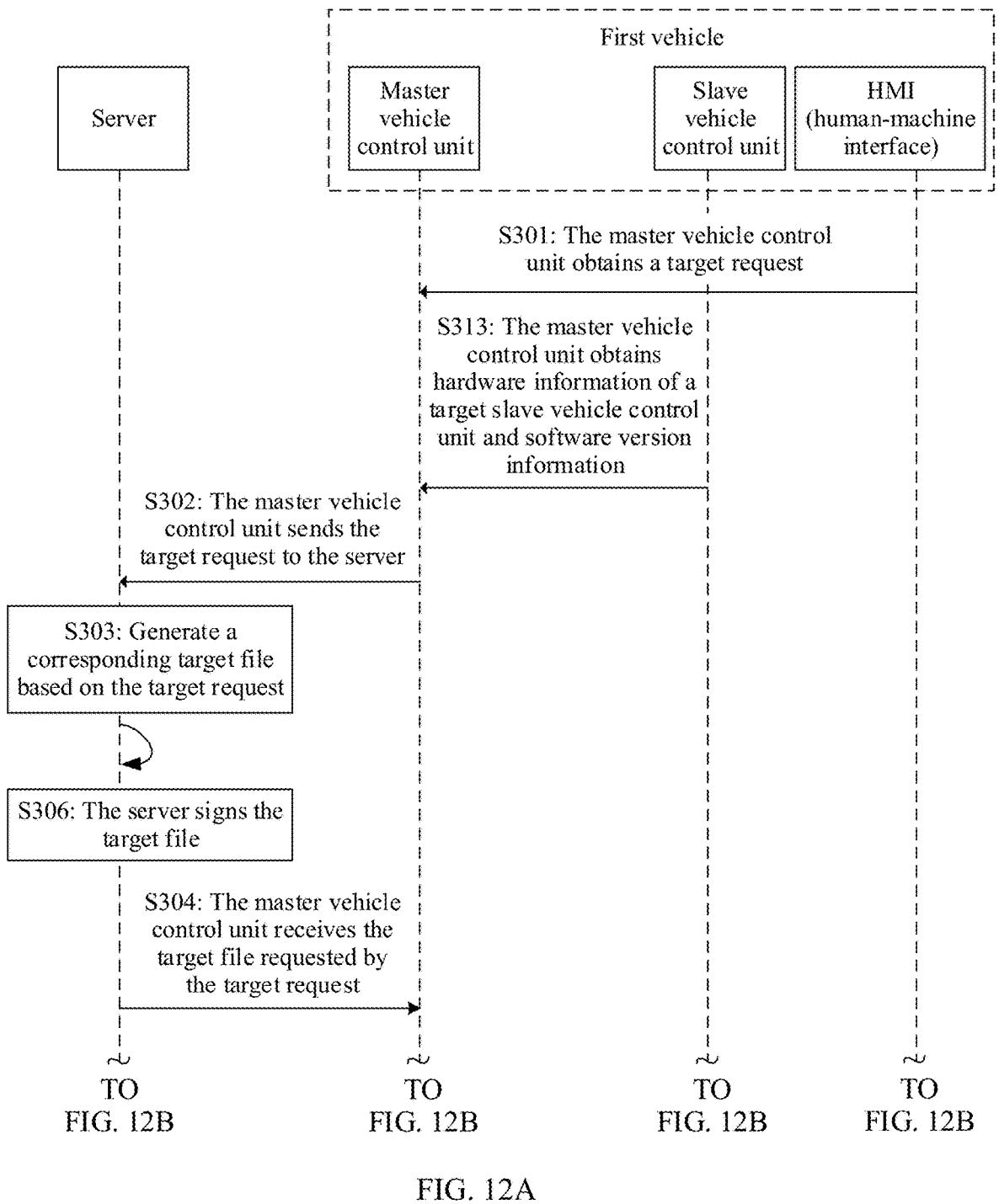
FIG. 12A and FIG. 12B are a schematic flowchart of another method for obtaining a file based on an OTA technology according to an embodiment of this application.
Figure 12B:
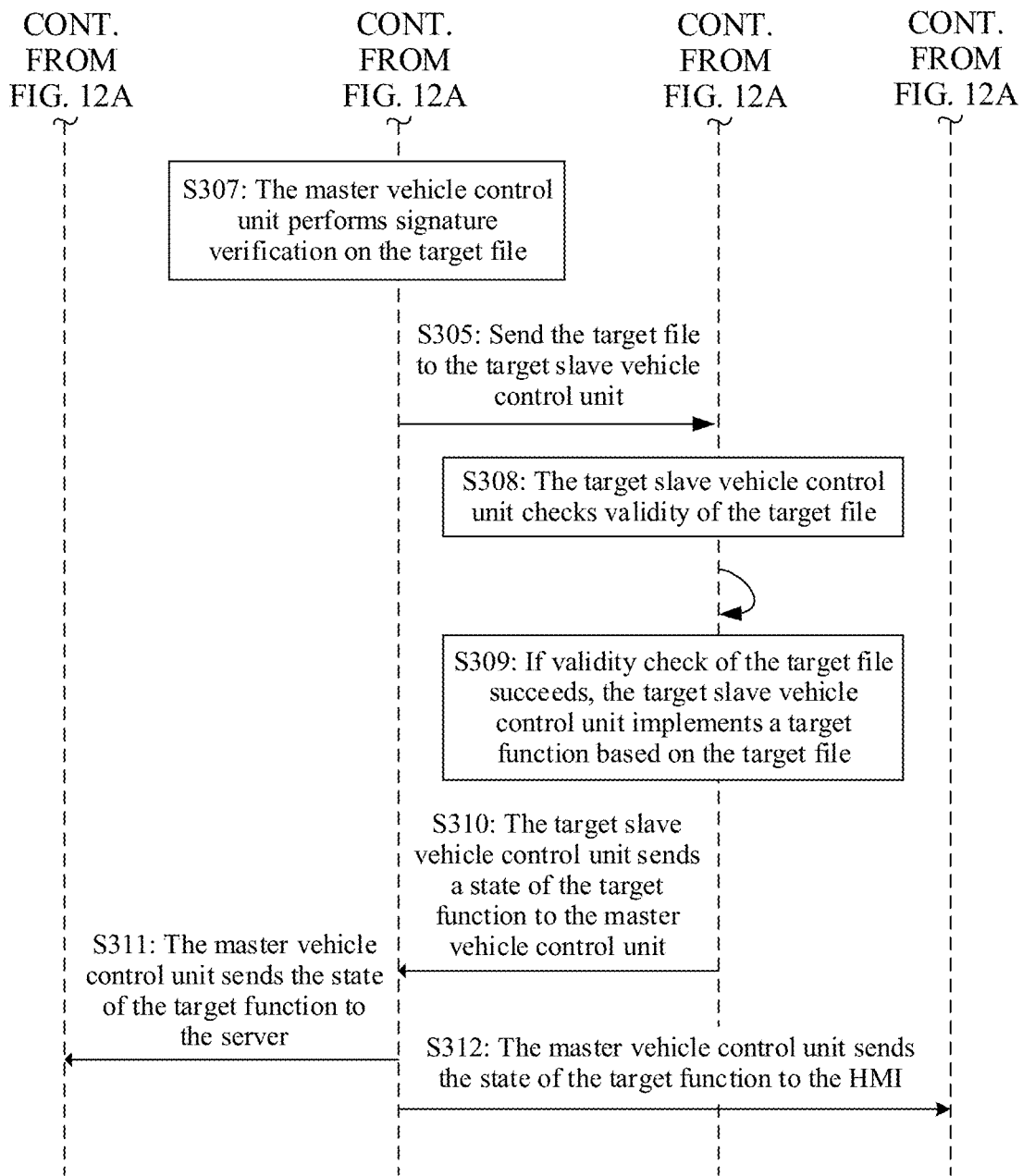

Refer to FIG. 12A and FIG. 12B. FIG. 12A and FIG. 12B are a schematic flowchart of a method for obtaining a file based on an OTA technology according to an embodiment of this application. The method may be applied to the system architecture in FIG. 4 or FIG. 8. With reference to FIG. 12A and FIG. 12B, the following provides descriptions from a perspective of interaction between a server, a master vehicle control unit of a first vehicle, and a target slave vehicle control unit of the first vehicle. The server, the master vehicle control unit of the first vehicle, the target slave vehicle control unit of the first vehicle, and a terminal device in this embodiment of this application may be the server 300, the vehicle 100, the master vehicle control unit 101, the target slave vehicle control unit 102, and the terminal device 300 described in FIG. 1 to FIG. 10. The method may include the following steps S301 to S305.

S301: The master vehicle control unit obtains a target request, where the target request includes target service information, the target service information is used to obtain a target file associated with a target function, and the target function is a function implemented by the target slave vehicle control unit in the one or more slave vehicle control units.

Specifically, the vehicle further includes a human-machine interaction interface HMI. A user triggers use or purchases a service or function through the HMI, and the HMI receives the target service information. The HMI sends the target service information of the user to the master vehicle control unit, where the target service information may include a service identifier and the like. Optionally, the user may also trigger use or purchases a service through a terminal device such as a smartphone. When receiving a purchase request of the user for a service, the smartphone obtains target service information, and sends the target service information to the HMI. Then the HMI forwards the target service information to the master vehicle control unit. Alternatively, the smartphone may directly send the target service information to the master vehicle control unit. This is not limited in this embodiment of this application.

S302: The master vehicle control unit sends a target request to the server.

Before the master vehicle control unit exchanges data with the server, the master vehicle control unit and the server may perform configuration, for example, configure a certificate and a private key. Based on configuration information, a secure channel is established between the master vehicle control unit and the server, for example, a Hyper Text Transfer Protocol over Secure Socket Layer (HTTPs) secure channel, a Transport Layer Security (TLS) secure channel, or a Datagram Transport Layer Security (DTLS) secure channel. In this way, information can be securely transmitted between the master vehicle control unit and the server. Optionally, the target request may further include an identification code of the vehicle. This is not limited in this embodiment of this application.

S303: The server generates the corresponding target file based on the target request.

Specifically, when receiving the target request sent by the master vehicle control unit, the server generates the corresponding target file according to the target request, where the target file is used to indicate the target slave vehicle control unit to implement the target function based on the target file. The server in this embodiment of this application may include an OTA server and a license server. The server may generate the corresponding target file based on the target request in the following manners. For example, when receiving the target request sent by the master vehicle control unit, the OTA server directly generates the corresponding target file based on the target request; or when receiving the target request sent by the master vehicle control unit, the OTA server forwards the target request to a file server, and the file server generates the corresponding target file based on the target request, and then sends the generated target file to the OTA server.

S304: The master vehicle control unit receives the target file requested by the target request.

Before sending the target file to the master vehicle control unit, the server may perform security processing on the target file. The security processing may be signature processing, encryption processing, other security processing, or the like, to prevent unauthorized modification on the target file. After receiving the target file, the main vehicle control unit may perform signature verification on the received target file.

S305: The master vehicle control unit sends the target file to the target slave vehicle control unit, where the target file is used to indicate the target slave vehicle control unit to implement the target function based on the target file.

Specifically, when receiving the target file sent by the server, the master vehicle control unit sends the target file to the target slave vehicle control unit which software corresponding to the target function is on. When receiving the target file, the target vehicle control unit implements the target function based on the target file.

In related technologies, when the vehicle needs to implement a specific service function, the vehicle needs to obtain a file corresponding to the service function from an external dedicated file server. Because the vehicle includes a plurality of components, and each component may be installed with a plurality of pieces of software implementing different service functions, managing files corresponding to different service functions of the vehicle by the file server are complex and inefficient. In this embodiment of this application, according to a related OTA technology, when a vehicle performs OTA remote firmware/software upgrade, a remote upgrade channel is established between a server and the vehicle (including a master vehicle control unit and one or more slave vehicle units). The master vehicle control unit has features of managing hardware information of each slave vehicle control unit and software version information corresponding to at least one piece of software installed on each slave vehicle control unit, and distributing an upgrade package for software on each slave vehicle control unit. After receiving the target request including the target service information, the vehicle initiates a related request to the server by reusing the OTA remote upgrade channel between the server and the vehicle, and receives, based on the OTA technology, the target file that is associated with the target function and that is sent by the server, to implement the target function based on the target file. In this way, a service-associated file can be obtained based on the OTA technology. In conclusion, in this application, the OTA remote upgrade channel between the server and the vehicle is reused, to avoid complex function-associated file management caused by a need to create a file management channel and a need to use a dedicated file server to complete generation, delivery, and management of function-associated files of the entire vehicle. In addition, the user may purchase a corresponding service for the vehicle based on a customized requirement. A customized requirement of the user can be met, purchase costs can be reduced, and user experience can be improved.

In a possible implementation, the method further includes:

S306: The server signs the target file.

S307: The master vehicle control unit performs signature verification on the target file.

If signature verification succeeds, the master vehicle control unit performs the operation of sending the target file to the target slave vehicle control unit, that is, performs operation S305.

Before sending the target file to the master vehicle control unit, the server may perform security processing on the target file. The security processing may be signature processing, encryption processing, other security processing, or the like, to prevent unauthorized modification on the target file. Optionally, when receiving the target file, the master vehicle control unit may directly perform signature verification on the target file, or may send the target file to the target slave vehicle control unit, and the target vehicle control unit performs signature verification. This is not limited in this embodiment of this application.

In this embodiment of this application, when the signed target file obtained from the outside of the vehicle is verified, the master vehicle control unit in the vehicle sends the target file to the target slave vehicle control unit inside the vehicle, to ensure security of vehicle service enabling.

In a possible implementation, the method further includes:

S308: The target slave vehicle control unit checks validity of the target file.

S309: If validity check of the target file succeeds, the target slave vehicle control unit implements the target function based on the target file.

When receiving the target file sent by the master vehicle control unit, the target slave vehicle control unit imports the target file, reads a unique identification field in the hardware information of the target slave vehicle control unit, and compares the unique identification field with a unique identification field included in the target file, to determine whether the target file is valid. If the unique identification field in the hardware information of the target slave vehicle control unit is consistent with or matches the unique identification field included in the target file, validity check of the target file succeeds. If the unique identification field in the hardware information of the target slave vehicle control unit is inconsistent with or does not match the unique identification field included in the target file, validity check of the target file fails. Optionally, validity check of the target file may also be performed by the master vehicle control unit. That is, when the master vehicle control unit performs signature verification on the target file, if signature verification succeeds, the master vehicle control unit checks validity of the target file. If validity check of the target file succeeds, the master vehicle control unit performs the operation of sending the target file to the target slave vehicle control unit. When receiving the target file, the target slave vehicle control unit directly implements the target function based on the target file.

In this embodiment of this application, when validity of the target file obtained from the outside of the vehicle is checked, the vehicle enables the target function based on the target file, and uses the target function within a service validity period. In this way, a situation in which service enabling fails because a received target file is not the target file corresponding to the target function can be avoided, and efficiency and security of vehicle function implementation can be ensured.

In a possible implementation, the target request further includes the hardware information of the target slave vehicle control unit; the target file includes a device feature code generated based on the hardware information of the slave vehicle control unit; and the target slave vehicle control unit can check validity of the target file in the following manners. The target slave vehicle control unit determines whether the hardware information of the target slave vehicle control unit matches the device feature code, and if the hardware information of the target slave vehicle control unit matches the device feature code, determines that the target file is valid.

Specifically, the target request sent by the master vehicle control unit to the server includes the hardware information of the slave vehicle control unit corresponding to the target function. When receiving the target request, the server generates the device feature code based on the hardware information of the slave vehicle control unit included in the target request. The target slave vehicle control unit checks whether the target file is valid by determining whether the hardware information of the target slave vehicle control unit matches the device feature code.

In this embodiment of this application, when validity of the target file obtained from the outside of the vehicle is checked, the vehicle implements the target function based on the target file. In this way, a situation in which the target function cannot be implemented because the received target file is not the target file corresponding to the target function can be avoided, and efficiency and security of vehicle service enabling can be ensured.

In a possible implementation, the target file includes a use license file of the target function.

Content of the license file may include a software manufacturer, a product name, a product version, a device feature code, an expiry date, a resource control item, a function control item, a signature, and the like. The license file includes some control policies (for example, a license control item) used to control running of software. The device feature code, the expiry date, the resource control item, and the function control item included in the license file are license control items. A license technology can be used to flexibly control software functions and a quantity of available resources. After validity check of the license file succeeds, the target slave vehicle control unit may run the software based on a control item of the license file, to enable the to-be-enabled service corresponding to the software.

In a possible implementation, the method further includes the following steps.

S310: The target slave vehicle control unit sends a state of the target function to the master vehicle control unit, where the state of the target function includes whether the target function is implemented and/or a validity period of the target function.

S311: The master vehicle control unit sends the state of the target function to the server.

S312: The master vehicle control unit sends the state of the target function to the human-machine interface.

Specifically, the target slave vehicle control unit may periodically send the state of the target function to the master vehicle control unit, and the master vehicle control unit sends the state of the target function to the server, so that the server can manage the delivered target file. In addition, the master vehicle control unit sends the state of the target function to the human-machine interface HMI, so that the user learns of the usage state of the service, the validity period of the service, and the like through the HMI.

In a possible implementation, the method further includes:

S313: The master vehicle control unit obtains the hardware information of the target slave vehicle control unit and software version information corresponding to at least one piece of software installed on the target slave vehicle control unit.

In a possible implementation, the target request further includes one or more of the validity period of the target function, the hardware information of the first vehicle, and at least one piece of software version information corresponding to at least one piece of software installed on the target slave vehicle control unit on the first vehicle; and the target file is generated by the server based on one or more of the target service information, the validity period of the target function, the hardware information, and the at least one piece of software version information.

Optionally, before the master vehicle control unit sends the target request, the master vehicle control unit queries the hardware information of the target slave vehicle control unit and the at least one piece of software version information corresponding to the at least one piece of software installed on the target slave vehicle control unit, and then sends, to the server, the target request that carries the hardware information of the target slave vehicle control unit and the software version information corresponding to the at least one piece of software installed on the target slave vehicle control unit. When receiving the target request, the server generates, based on the hardware information of the target slave vehicle control unit and the at least one piece of software version information corresponding to the at least one piece of software installed on the target slave vehicle control unit in the target request, the target file that matches the target function, the hardware information of the target vehicle control unit, and the software that is installed on the target control unit and that corresponds to the target function.

In a possible implementation, when the target request further includes the hardware information of the target slave vehicle control unit and the software version information corresponding to the at least one piece of software installed on the target slave vehicle control unit, that the server generates the corresponding target file based on the target request includes: The server generates the device feature code based on the hardware information of the target slave vehicle control unit; the server generates a resource control item and a function control item based on the software version information corresponding to the at least one piece of software installed on the target slave vehicle control unit; and the server generates the target file based on the service information of the target function, the device feature code, the resource control item, and the function control item.

Specifically, an example of a typical target file (for example, a license file) may be that shown in Table 1.

TABLE 1

| Content | Description |
| --- | --- |
| Software manufacturer | ABC company |
| Product name | Office software |
| Product version | V2.0 |
| Device feature code | Is usually related to hardware of a device, and may be a media access control (MAC) address, a CPU serial number, a disk serial number, or the like |
| Expiry date | Validity period of software |
| Resource control item | Quantity of resources that can be used for a function of software, for example, a quantity of clients allowed to access a web server |
| Function control item | Function allowed by software |
| Signature | Is used to prevent unauthorized modification of a target file |

In this embodiment of this application, a situation in which the target file delivered by the server is not a target file that is for the target slave control unit or current version information of the software corresponding to the target function can be avoided. In this way, a situation in which the target function cannot be implemented can be avoided. When receiving the target request, the server generates, based on the hardware information of the target slave vehicle control unit and the at least one piece of software version information corresponding to the at least one piece of software installed on the target slave vehicle control unit in the target request, the target file that matches the target function, the hardware information of the target vehicle control unit, and the software that is installed on the target control unit and that corresponds to the target function. In this way, it can be ensured that service provisioning is efficient and well targeted.

Figure 13:
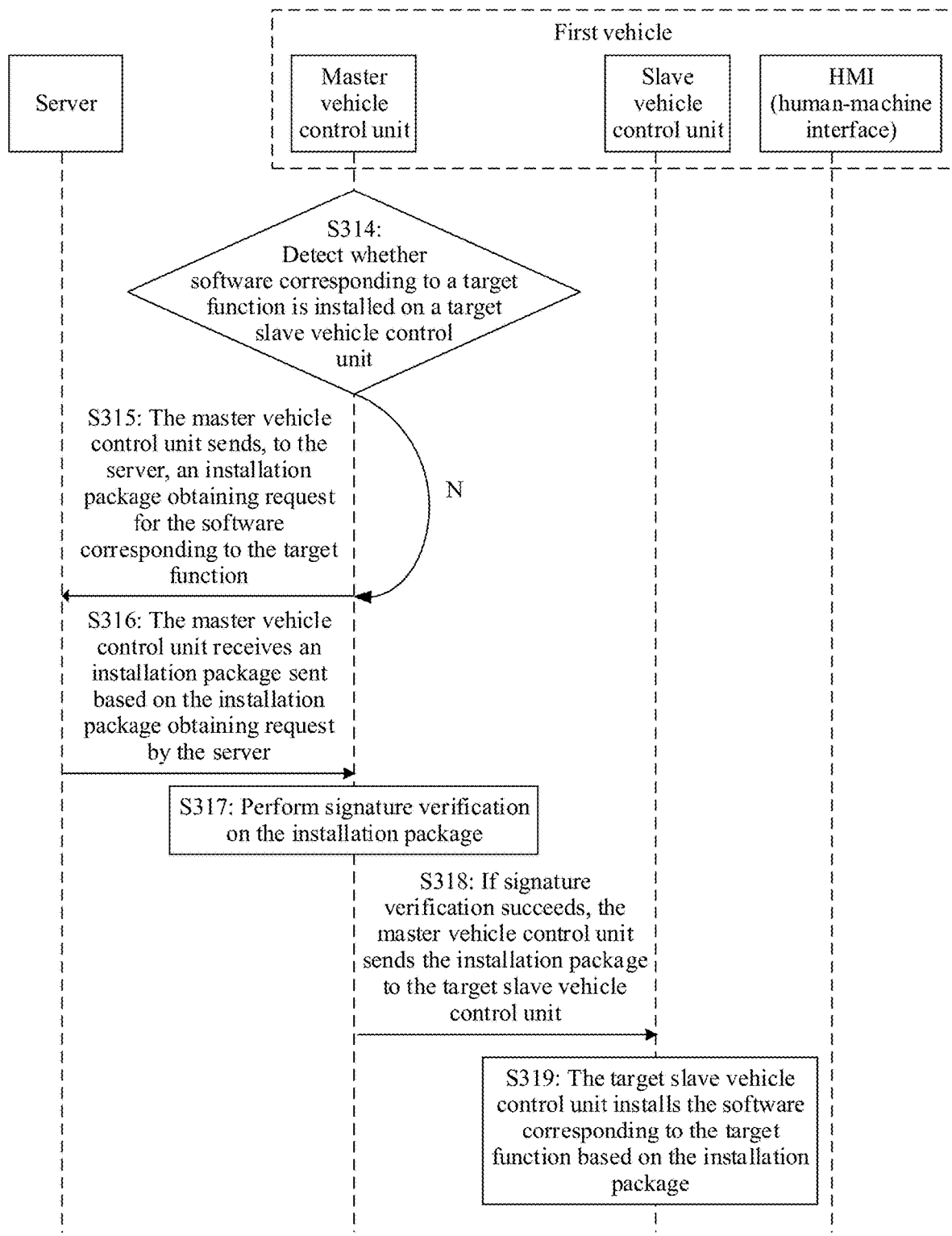
FIG. 13 is a schematic flowchart of still another method for obtaining a file based on an OTA technology according to an embodiment of this application.
Figure 14A:
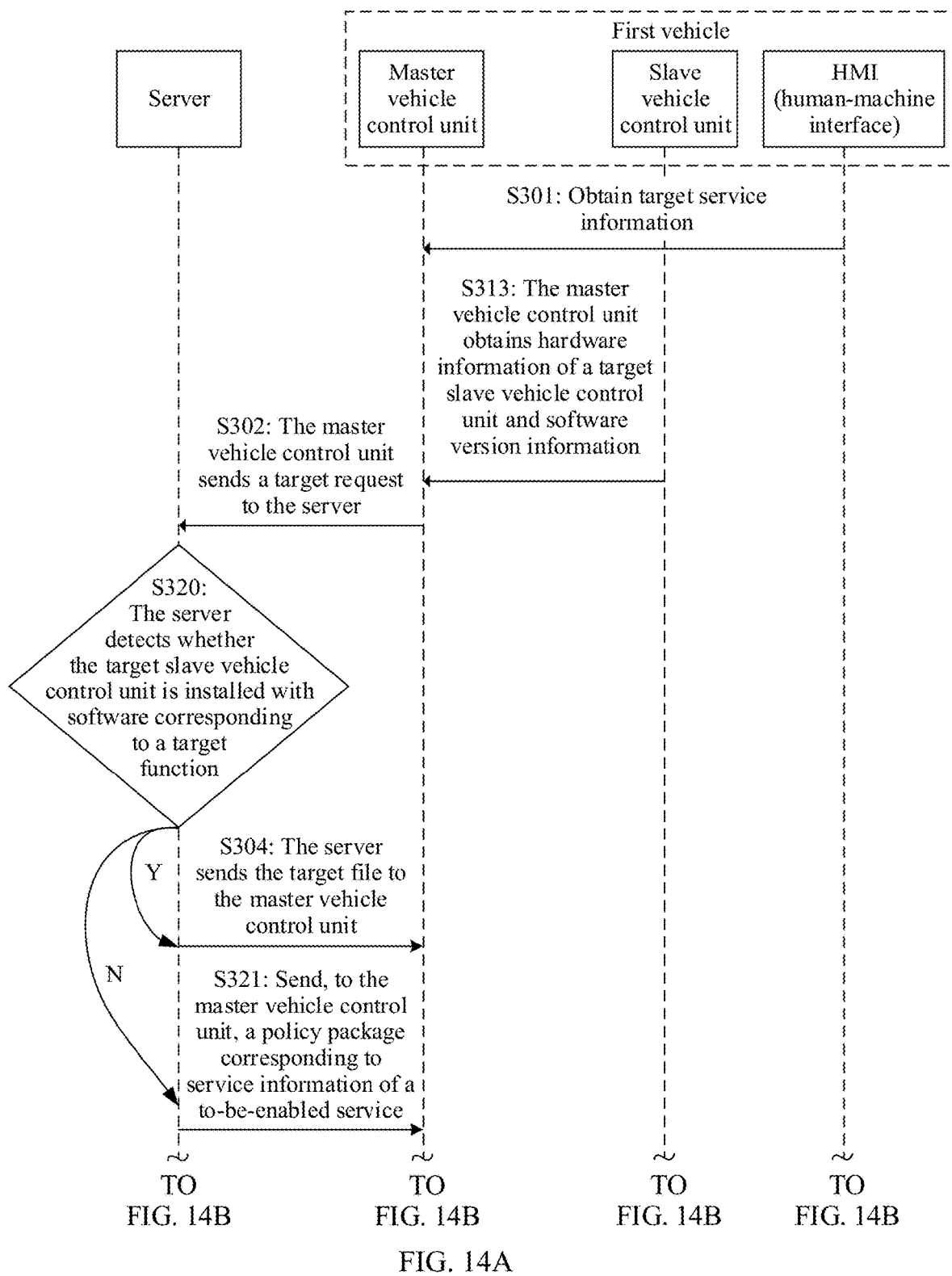
FIG. 14A and FIG. 14B are a schematic flowchart of yet another method for obtaining a file based on an OTA technology according to an embodiment of this application.
Figure 14B:
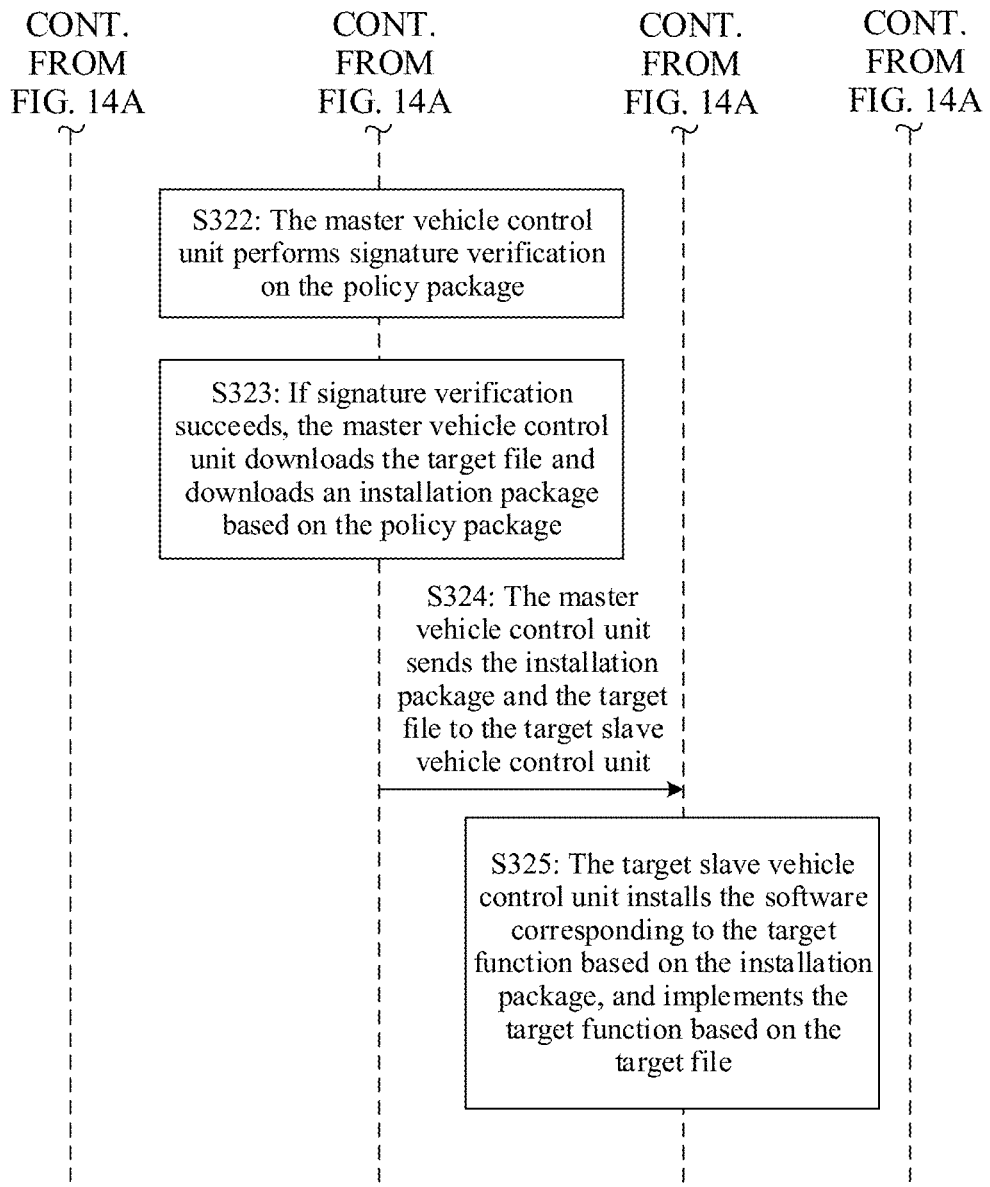

Optionally, when the master vehicle control unit obtains the target service information, the master vehicle control unit or the server determines whether the software corresponding to the target function is installed on the target slave vehicle control unit, that is, whether an installation package of the software corresponding to the target function needs to be downloaded. The foregoing embodiment is implemented when the master vehicle control unit or the server determines that the software corresponding to the target function is installed on the target slave vehicle control unit. With reference to FIG. 13, FIG. 14A, and FIG. 14B, the following describes an operation that needs to be performed by a server, a master vehicle control unit, or a target slave vehicle control unit if it is determined that software corresponding to a target function is not installed on the target slave vehicle control unit. In steps S314 to S319, that is, FIG. 13, determining whether the software corresponding to the target function is installed on the target slave vehicle control unit is performed by the master vehicle control unit. In steps S320 to S325, that is, FIG. 13, determining whether the software corresponding to the target function is installed on the target slave vehicle control unit is performed by the server.

In a possible implementation, the master vehicle control unit determines whether the software corresponding to the target function is installed on the target slave vehicle control unit. With reference to FIG. 12A and FIG. 12B, the following provides descriptions from a perspective of interaction between the server, the master vehicle control unit of the vehicle, and the target slave vehicle control unit of the vehicle. The method may further include steps S314 to S319. The method further includes the following steps.

S314: The master vehicle control unit detects, based on the target service information and the software version information corresponding to the at least one piece of software installed on the target slave vehicle control unit, whether the software corresponding to the target function is installed on the target slave vehicle control unit.

Specifically, when obtaining the hardware information of the target slave vehicle control unit and the software version information corresponding to the at least one piece of software installed on the target slave vehicle control unit, the master vehicle control unit determines, based on the software version information and the target service information, whether the software corresponding to the target function is installed on the target slave vehicle control unit.

S315: If the software corresponding to the target function is not installed on the target slave vehicle control unit, the master vehicle control unit sends, to the server, an installation package obtaining request for the software corresponding to the target function.

Specifically, the installation package obtaining request may include a software identifier, software version information, and the hardware information of the target slave vehicle control unit.

S316: The master vehicle control unit receives an installation package sent based on the installation package obtaining request by the server.

When receiving the installation package obtaining request sent by the master vehicle control unit, the server may obtain the installation package from the developer, and perform security processing such as signature or encryption on the installation package, to prevent unauthorized modification on the installation package.

S317: The master vehicle control unit performs signature verification on the installation package.

S318: If signature verification succeeds, the master vehicle control unit sends the installation package to the target slave vehicle control unit.

S319: The target slave vehicle control unit installs the software corresponding to the target function based on the installation package.

In this embodiment of this application, when obtaining the target service information, the master vehicle control unit obtains the at least one piece of software version information corresponding to the at least one piece of software installed on the target slave vehicle control unit corresponding to the target function; determines, based on the target service information and the at least one piece of software version information included in the service information, whether the software corresponding to the target function is installed on the target slave vehicle control unit; and if it is determined that the software corresponding to target function is not installed on the target slave vehicle control unit, sends, to the server, the installation package obtaining request for the software corresponding to the target function. When the software corresponding to the target function is installed on the target slave vehicle control unit, the target slave vehicle control unit implements the target function based on the software and the target file, to ensure that a service function subscribed by the user is successfully enabled and used.

In a possible implementation, the server determines whether the software corresponding to the target function is installed on the target slave vehicle control unit. With reference to FIG. 14A and FIG. 14B, the following provides descriptions from a perspective of interaction between the server, the master vehicle control unit of the vehicle, and the target slave vehicle control unit of the vehicle. The method may further include steps S320 to S325.

S320: The server detects, based on the software version information and the target service information, whether the software corresponding to the target function is installed on the target slave vehicle control unit.

Specifically, the target request further includes the hardware information of the target slave vehicle control unit and the software version information corresponding to the at least one piece of software installed on the target slave vehicle control unit, and the target request is further configured to indicate the server to detect, based on the software version information and the target service information, whether the software corresponding to the target function is installed on the target slave vehicle control unit.

If it is detected that the software corresponding to the target function is installed on the target slave vehicle control unit, the server performs the operation of sending the target file to the master vehicle control unit, and the master vehicle control unit performs the operation of receiving the target file sent by the server, that is, performs step S304. For a specific operation, refer to related descriptions of step S304. Details are not described herein again.

If it is detected that the software corresponding to the target function is not installed on the vehicle, the server sends, to the master vehicle control unit, the target file and the installation package of the software corresponding to the target function. For the operation of sending the target file by the server to the master vehicle control unit, refer to related descriptions of step S304. Details are not described herein again. Optionally, that the server sends, to the master vehicle control unit, the installation package of the software corresponding to the target function may include steps S321 to S323.

S321: If it is detected that the software corresponding to the target function is not installed on the vehicle, the server sends, to the master vehicle control unit, a policy package corresponding to the service information of the target function and the target file, where the policy package includes a download address of the installation package of the software corresponding to the target function, and the policy package is used by the master vehicle control unit to download the installation package according to the policy package.

Specifically, when detecting whether the software version information corresponding to the at least one piece of software installed on the target slave vehicle control unit includes the software corresponding to the target function, the server obtains the installation package corresponding to the target function, generates the target file and the policy package, and separately performs security processing on the installation package corresponding to the target function, the target file, and the policy package. The security processing may be signature processing, encryption processing, other security processing, or the like, to prevent unauthorized modification on the target file. The policy package may include a download address of the installation package corresponding to the target function, an implementation condition of the target function, a size of the installation package or the target file, and the like. This is not limited in this embodiment of this application. For a manner of generating the target file by the server, refer to related descriptions of generating the target file in step S303 and other embodiments. Details are not described herein again.

S322: The master vehicle control unit performs signature verification on the policy package.

Specifically, for a process in which the master vehicle control unit performs signature verification on the policy package, refer to related descriptions of signature verification on the target file in S307. Details are not described herein again.

S323: If signature verification succeeds, the master vehicle control unit downloads the installation package based on the policy package.

Specifically, if signature verification succeeds, the master vehicle control unit receives the target file sent by the server together with the policy package, and downloads the installation package based on the policy package. There are a plurality of methods for implementation of downloading the installation package and receiving the target file by the master vehicle control unit. For example, the installation package and the target file are downloaded and received simultaneously. Alternatively, the master vehicle control unit first downloads the installation package, and then sends the installation package to the target slave vehicle control unit. When the installation package is installed on the target slave vehicle unit, the master vehicle control unit is notified and then downloads and receives the target file. When the target file is downloaded and received, the master vehicle control unit sends the target file to the target slave vehicle control unit, and the target slave vehicle control unit controls, based on the target file, running of the software and the target function. Alternatively, the master vehicle control unit first receives the target file, and if signature verification and validity check of the target file succeed, the master vehicle control unit downloads the installation package. Subsequent operations in this embodiment of this application, that is, steps S322 and S323, are described by using an example in which the installation package and the license are downloaded simultaneously. When the installation package and the target file are not downloaded simultaneously, corresponding steps are split. Details are not described herein again.

S324: The master vehicle control unit sends the installation package and the target file to the target slave vehicle control unit.

When receiving the target file and downloading the installation package based on the policy package, the master vehicle control unit may further separately perform signature verification on the installation package and the target file. If signature verification succeeds, the master vehicle control unit sends the installation package and the target file to the target slave vehicle control unit.

S325: The target slave vehicle control unit installs the software corresponding to the target function based on the installation package, and implements the target function based on the target file.

Specifically, when receiving the target file sent by the master vehicle control unit, the target slave vehicle control unit further checks validity of the target file. If validity check of the target file succeeds, the target slave vehicle control unit implements the target function based on the target file. For the operation of validity check of the target file by the target slave vehicle control unit, refer to related descriptions of validity check of the target file by the target slave vehicle control unit in S308 and S309 and other embodiments. Details are not described herein again.

In this embodiment of this application, when receiving the target request sent by the master control unit, the server determines, based on the target service information and the at least one piece of software version information that are included in the target request, whether software corresponding to the target function is installed on the target slave vehicle control unit, and if the server determines that the software corresponding to the target function is not installed on the target slave vehicle control unit, sends the target file and the policy package that includes the download address of the installation package to the master vehicle control unit. When the software corresponding to the target function is installed on the target slave vehicle control unit, the target slave vehicle control unit enables the target function, to ensure that a service subscribed by the user is successfully enabled and used.

Figure 15A:
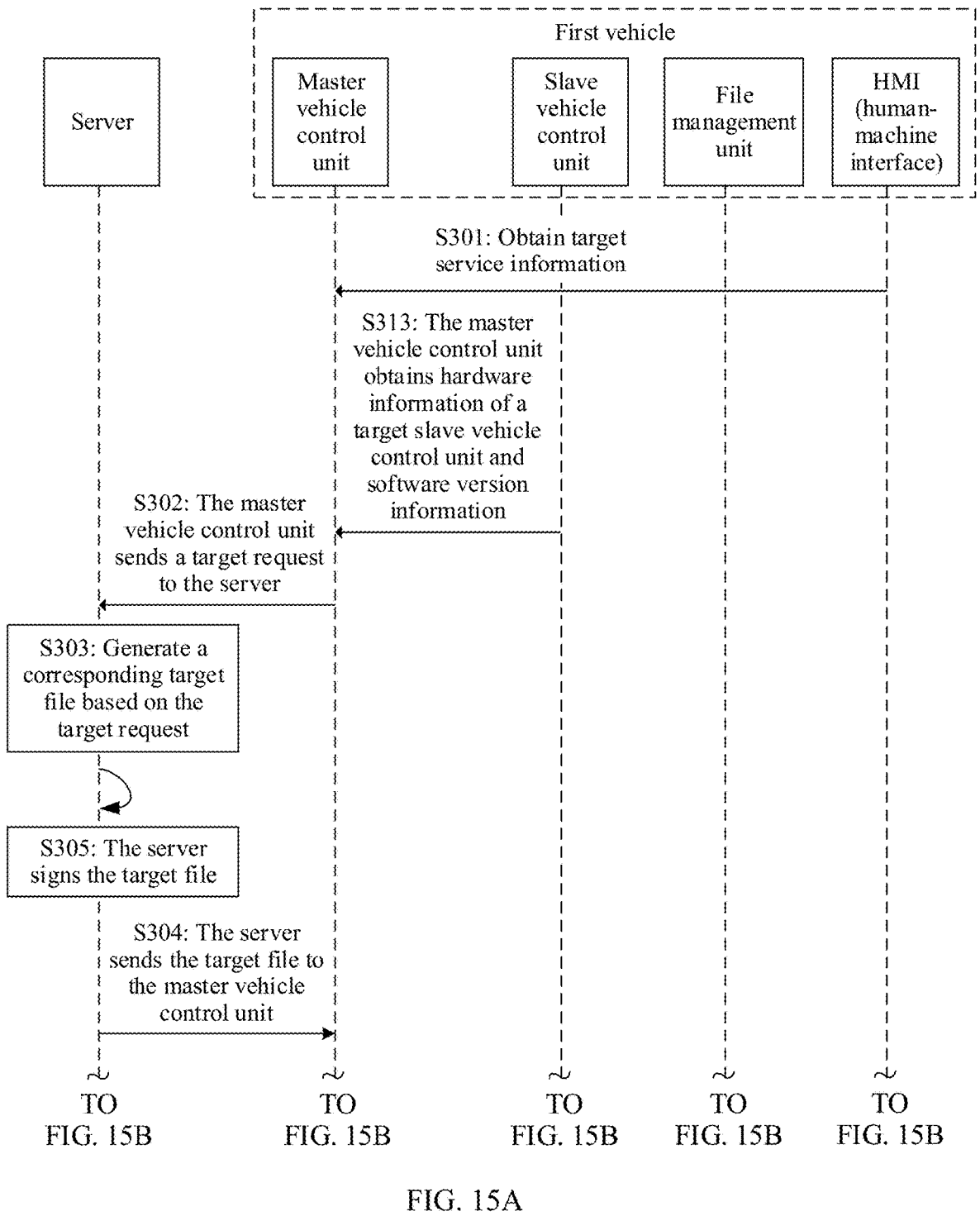
FIG. 15A and FIG. 15B are a schematic flowchart of still yet another method for obtaining a file based on an OTA technology according to an embodiment of this application.
Figure 15B:
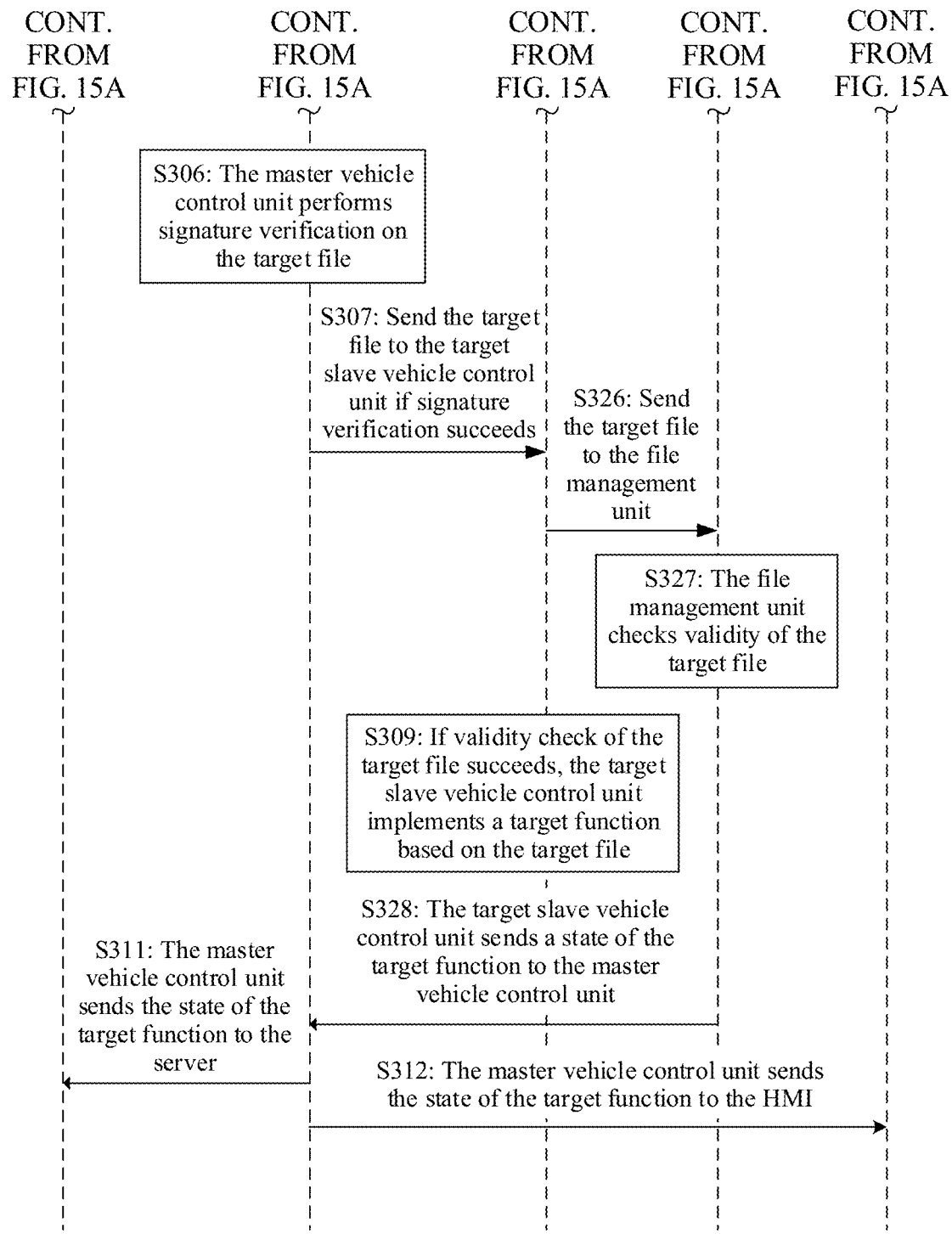

In some other embodiments, as shown in FIG. 15A and FIG. 15B, the vehicle may further include a file management unit. The file management unit may be located in a slave vehicle control unit, or may be located in another component of the vehicle. When the vehicle includes the file management unit, the file management unit may check validity of the target file, and if validity check of the target file succeeds, the file management unit indicates the target slave vehicle control unit to implement the target function based on the target file. The file management unit may periodically send the state of the target function to the master vehicle control unit, and the master vehicle control unit sends the state of the target function to the server, so that the server can manage the delivered target file. In addition, the file management unit may send the state of the target function to the master vehicle control unit, so that the master vehicle control unit sends the state of the target function to the HMI, and the user can learn of the usage state of the service, the validity period of the service, and the like through the HMI. Therefore, with reference to FIG. 12A, FIG. 12B, FIG. 14A, and FIG. 14B, when the vehicle may further include a file management unit, a difference lies in that the method further includes the following steps.

S326: The target slave vehicle control unit sends the received target file to the file management unit.

S327: The file management unit checks validity of the target file, and if validity check succeeds, indicates the target slave vehicle control unit to perform step S309, that is, enable the target function based on the target file, and use the target function in a service validity period.

The embodiments corresponding to FIG. 12A to FIG. 14B may be considered as embodiments in which the file management unit is located in the slave vehicle control unit, that is, the ECU, of the vehicle. The embodiment corresponding to FIG. 15A and FIG. 15B may be considered as an embodiment in which the file management unit is located in another component of the vehicle other than the slave vehicle control unit.

The method in embodiments of this application is described above in detail. A related apparatus in embodiments of this application is provided below.

Figure 16:
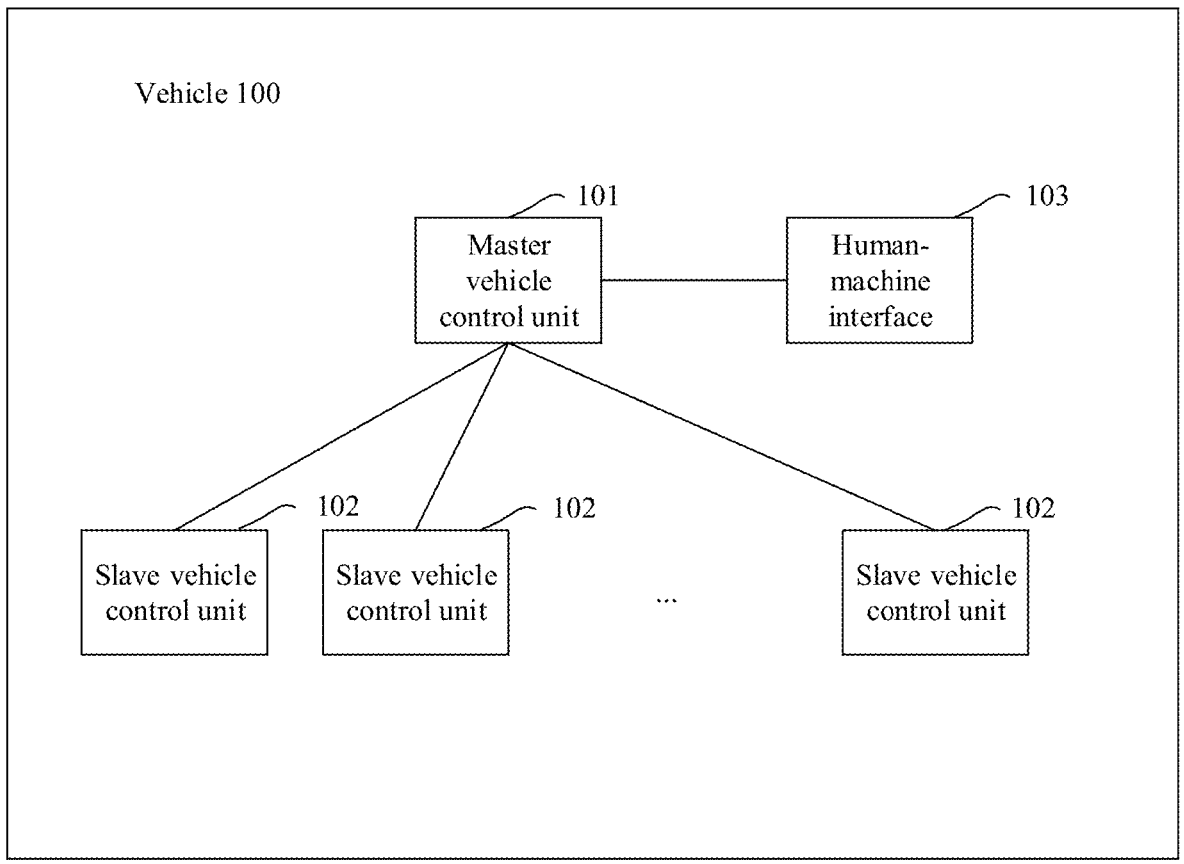
FIG. 16 is a schematic diagram of a structure of a vehicle according to an embodiment of this application.

Refer to FIG. 16. FIG. 16 is a schematic diagram of a structure of a vehicle 100 according to an embodiment of this application. The vehicle 100 includes a master vehicle control unit 101 and one or more slave vehicle control units 102. The vehicle 100 may be the vehicle 100 in the foregoing system. The master vehicle control unit 101 may be the master vehicle control unit 101 in the foregoing system. The slave vehicle control unit 102 may be the slave vehicle control unit 102 in the foregoing system. Detailed descriptions of the units are as follows.

The master vehicle control unit 101 is configured to: obtain a target request, where the target request includes target service information, the target service information is used to obtain a target file associated with a target function, and the target function is a function implemented by a target slave vehicle control unit 102 in one or more slave vehicle control units 102; send a target request to a server; receive the target file requested by the target request; and send the target file to the target slave vehicle control unit 102, where the target file is used to indicate the target slave vehicle control unit to implement the target function based on the target file.

In a possible implementation, the master vehicle control unit 101 is further configured to perform signature verification on the target file; and if signature verification of the target file succeeds, the master vehicle control unit 101 performs the operation of sending the target file to the target slave vehicle control unit 102.

In a possible implementation, the target slave vehicle control unit 102 is further configured to check validity of the target file; and the target slave vehicle control unit 102 implements the target function based on the target file if validity check of the target file succeeds.

In a possible implementation, the target request further includes hardware information of the target slave vehicle control unit; the target file includes a device feature code generated based on the hardware information; and when configured to check validity of the target file, the target slave vehicle control unit 102 is specifically configured to determine whether the hardware information matches the device feature code, and if the hardware information matches the device feature code, determine that the target file is a valid file.

In a possible implementation, the master vehicle control unit 101 is further configured to detect, based on the target service information and at least one piece of software version information corresponding to at least one piece of software installed on the target slave vehicle control unit in the first vehicle, whether the software corresponding to the target function is installed on the target slave vehicle control unit 102.

In a possible implementation, if the software corresponding to the target function is not installed on the target slave vehicle control unit 102, the master vehicle control unit 101 is further configured to send, to the server, an installation package obtaining request for the software corresponding to the target function.

In a possible implementation, the master vehicle control unit 101 is further configured to receive the installation package sent based on the installation package obtaining request by the server, and perform signature verification on the installation package; and if signature verification of the installation package succeeds, send the installation package to the target slave vehicle control unit 102. The target slave vehicle control unit 102 is further configured to install the software corresponding to the target function based on the installation package, and implement the target function based on the software and the target file.

In a possible implementation, the target request further includes the at least one piece of software version information corresponding to the first vehicle. The master vehicle control unit 101 is further configured to receive the installation package that is of the software corresponding to the target function and that is sent by the server, and perform signature verification on the installation package, where the installation package is sent by the server when the server detects, based on the target service information and the software version information, that the software corresponding to the target function is not installed on the first vehicle (the target slave vehicle control unit in the vehicle); and if signature verification of the installation package succeeds, send the installation package to the target slave vehicle control unit 102. The target slave vehicle control unit 102 is configured to install the software corresponding to the target function based on the installation package, and implement the target function based on the software and the target file.

In a possible implementation, the first vehicle further includes a human-machine interface 103. When configured to obtain the target request, the master vehicle control unit 101 is specifically configured to obtain the target request through the human-machine interface 103.

In a possible implementation, the master vehicle control unit 101 is further configured to send a state of the target function to the server and/or the human-machine interface 103, where the state of the target function includes whether the target function is implemented and/or a validity period of the target function.

In a possible implementation, the target request further includes one or more of the validity period of the target function, the hardware information of the first vehicle, and at least one piece of software version information corresponding to at least one piece of software installed on the target slave vehicle control unit on the first vehicle; and the target file is generated by the server based on one or more of the target service information, the validity period of the target function, the hardware information, and the at least one piece of software version information.

In a possible implementation, the target file includes a use license file of the target function.

It should be noted that, for the master vehicle control unit 101 and the target slave vehicle control unit 102 in the vehicle 100 described in this embodiment of this application, refer to related descriptions of the master vehicle control unit and the slave vehicle control unit in the method embodiments in FIG. 12A to FIG. 15B. Details are not described herein again.

It can be understood that, functions of an intelligent driving system, a life service system, a safety protection system, a positioning service system, a vehicle service system, and the like may further be integrated on the vehicle 100 by using technologies such as computer, modern sensing, information convergence, communications, artificial intelligence, automatic control. This is not specifically limited in this application. Details are not described herein.

Figure 17:
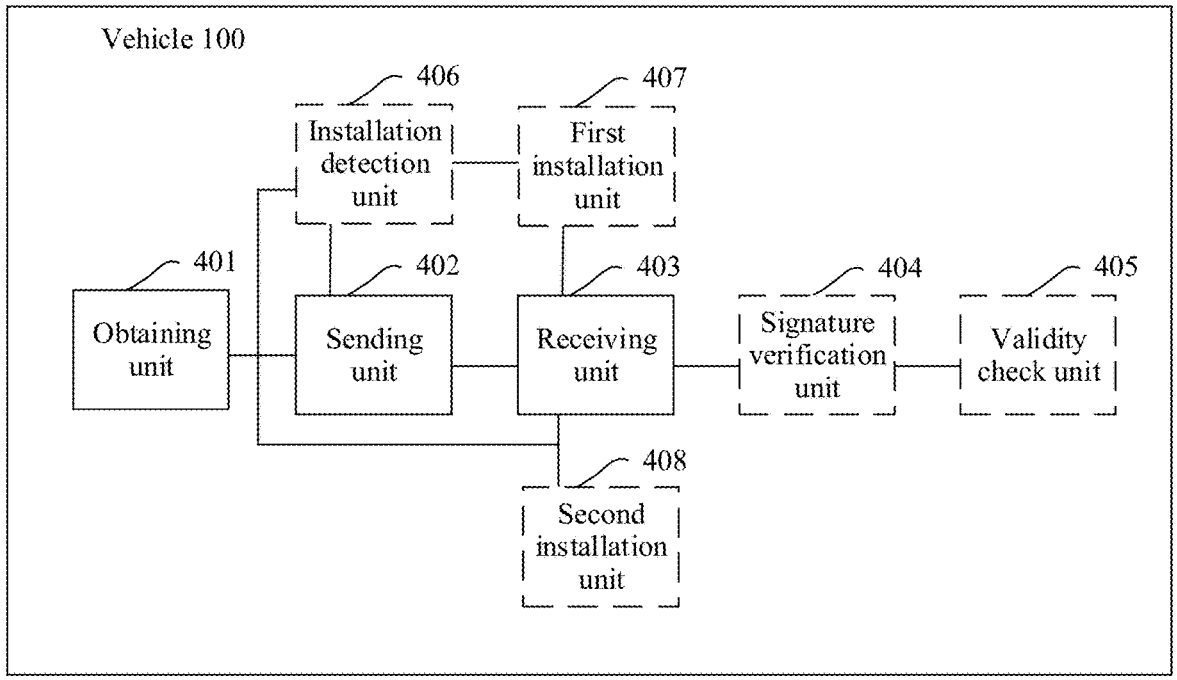
FIG. 17 is a schematic diagram of a structure of a vehicle according to an embodiment of this application.

Refer to FIG. 17. FIG. 17 is a schematic diagram of a structure of another vehicle 100 according to an embodiment of this application. The vehicle 100 may be the vehicle 100 in the foregoing system. The vehicle 100 may include an obtaining unit 401, a sending unit 402, and a receiving unit 403. Detailed descriptions of the units are as follows.

The obtaining unit 401 is configured to obtain a target request, where the target request includes target service information, and the target service information is used to obtain a target file associated with a target function.

The sending unit 402 is configured to send the target request to a server.

The receiving unit 403 is configured to receive the target file requested by the target request, where the target file is used to indicate the vehicle to implement the target function.

In a possible implementation, the obtaining unit 401 is specifically configured to obtain the target request by using an OTA technology, where the target request includes the target service information, and the target service information is used to obtain the target file associated with the target function.

In a possible implementation, the sending unit 402 is specifically configured to send the target request to the server by using the OTA technology.

In a possible implementation, the vehicle further includes:
 a signature verification unit 404, configured to perform signature verification on the target file, where the vehicle implements the target function based on the target file if signature verification of the target file succeeds.

In a possible implementation, the vehicle 100 further includes:
 a validity check unit 405, configured to check validity of the target file, where the vehicle implements the target function based on the target file if validity check of the target file succeeds.

In a possible implementation, the target request further includes hardware information of the vehicle; the target file includes a device feature code generated based on the hardware information; and the validity check unit 405 is specifically configured to determine whether the hardware information matches the device feature code, and if the hardware information matches the device feature code, determine that the target file is a valid file.

In a possible implementation, the vehicle 100 further includes:
 an installation detection unit 406, configured to detect, based on the target service information and at least one piece of software version information corresponding to the vehicle, whether software corresponding to the target function is installed on the vehicle.

In a possible implementation, the sending unit 402 is further configured to: if the software corresponding to the target function is not installed on the vehicle, send, to the server, an installation package obtaining request for the software corresponding to the target function.

In a possible implementation, the vehicle 100 further includes:
 a first installation unit 407, configured to receive the installation package sent based on the installation package obtaining request by the server, and perform signature verification on the installation package; and if signature verification of the installation package succeeds, based on the installation package, install the software corresponding to the target function, and implement the target function based on the software and the target file.

In a possible implementation, the target request further includes the at least one piece of software version information corresponding to the vehicle. The vehicle further includes:

a second installation unit 408, configured to receive the installation package that is of the software corresponding to the target function and that is sent by the server, and perform signature verification on the installation package, where the installation package is sent by the server when the server detects, based on the target service information and the software version information, that the software corresponding to the target function is not installed on the vehicle; and if signature verification of the installation package succeeds, install the software corresponding to the target function based on the installation package, and implement the target function based on the software and the target file.

In a possible implementation, the vehicle includes a master vehicle control unit and one or more slave vehicle control units; the target function is a function implemented by a target slave vehicle control unit in the one or more slave vehicle control units; and the receiving unit 403 is specifically configured to: receive, through the master vehicle control unit, the target file requested by the target request; and send, through the master vehicle control unit, the target file to the target slave vehicle control unit, where the target file is used to indicate the target slave vehicle control unit to implement the target function based on the target file.

In a possible implementation, the vehicle further includes a human-machine interface. The obtaining unit 401 is specifically configured to obtain the target request through the human-machine interface.

In a possible implementation, the sending unit 402 is further configured to send a state of the target function to the server, where the state of the target function includes whether the target function is implemented and/or a validity period of the target function.

In a possible implementation, the target request further includes one or more of the validity period of the target function, the hardware information of the vehicle, and the at least one piece of software version information corresponding to the vehicle; and the target file is generated by the server based on one or more of the target service information, the validity period of the target function, the hardware information, and the at least one piece of software version information.

In a possible implementation, the target file includes a use license file of the target function.

It should be noted that for functions of the functional units in the vehicle described in this embodiment of this application, reference may be made to the related descriptions of the foregoing method embodiments in FIG. 11A to FIG. 15B. Details are not described herein again.

Figure 18:
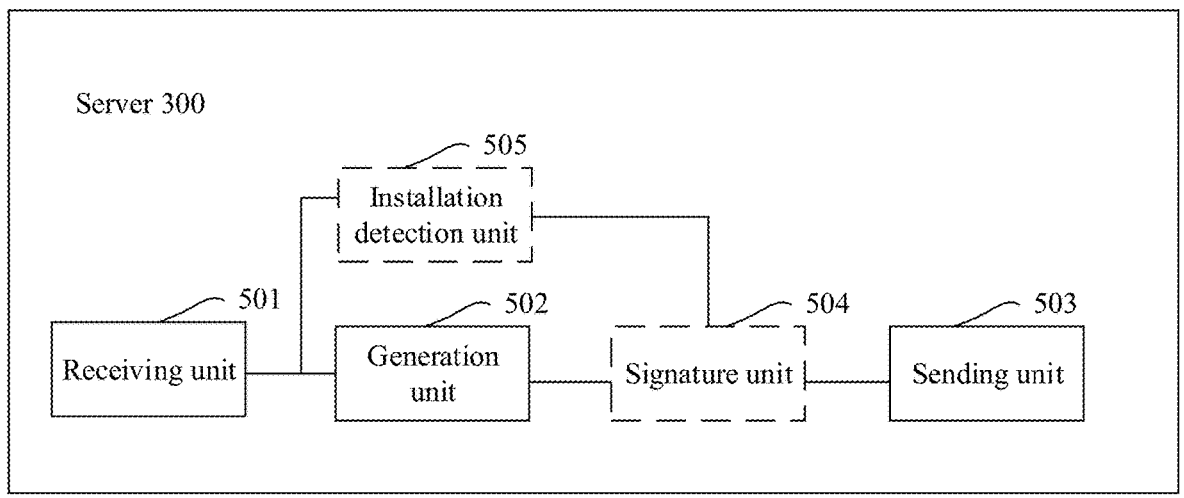
FIG. 18 is a schematic diagram of a structure of a server according to an embodiment of this application.

Refer to FIG. 18. FIG. 18 is a schematic diagram of a structure of a server 300 according to an embodiment of this application. The server 300 may be the server 300 in the foregoing system. The server may include a receiving unit 501, a generation unit 502, and a sending unit 503. Detailed descriptions of the units are as follows.

The receiving unit 501 is configured to receive a target request sent by a first vehicle, where the target request includes target service information, and the target service information is used to obtain a target file associated with a target function.

The generation unit 502 is configured to generate the corresponding target file based on the target request.

The sending unit 503 is configured to send the target file to the first vehicle, where the target file is used to indicate the first vehicle to implement the target function.

In a possible implementation, the receiving unit 501 is specifically configured to receive, by using an OTA technology, the target request sent by the first vehicle.

In a possible implementation, the sending unit 503 is specifically configured to send the target file to the first vehicle by using the OTA technology.

In a possible implementation, the server 300 further includes: a signature unit 504, configured to sign the target file.

In a possible implementation, the target request further includes at least one piece of software version information corresponding to the first vehicle. The server 300 further includes an installation detection unit 505 configured to detect, based on the at least one piece of software version information and the target service information, whether software corresponding to the target function is installed on the first vehicle.

The sending unit 503 is further configured to: if the software corresponding to the target function is not installed on the first vehicle, send, to the first vehicle, an installation package of the software corresponding to the target function, where the installation package is used to install, on the first vehicle based on the installation package, the software corresponding to the target function.

In a possible implementation, the target request further includes one or more of a validity period of the target function, hardware information of the first vehicle, and the at least one piece of software version information corresponding to the first vehicle.

In a possible implementation, the generation unit 502 is specifically configured to:
generate a device feature code based on the hardware information of the first vehicle;
generate a resource control item and a function control item based on the at least one piece of software version information corresponding to the first vehicle; and
generate the target file based on the target service information, the validity period of the target function, the device feature code, the resource control item, and the function control item.

In a possible implementation, the receiving unit 501 is further configured to receive a state of the target function that is sent by the first vehicle, where the state of the target function includes whether the target function is enabled and/or the validity period of the target function.

In a possible implementation, the target file includes a use license file of the target function.

It should be noted that for functions of the functional units in the server described in this embodiment of this application, reference may be made to the related descriptions of the foregoing method embodiments in FIG. 11A to FIG. 15B. Details are not described herein again.

Figure 19:
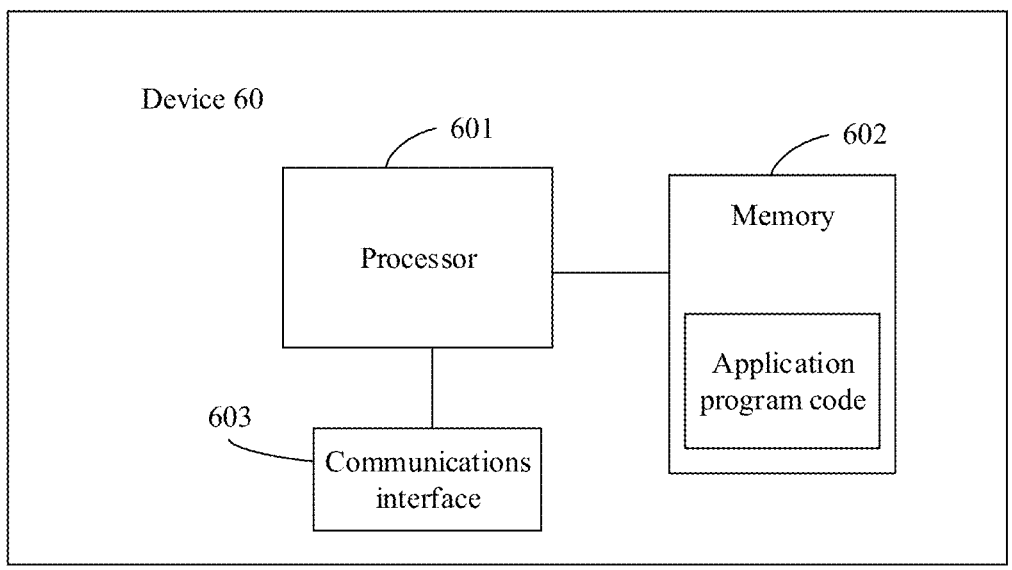
FIG. 19 is a schematic diagram of a structure of a device according to an embodiment of this application.

Refer to FIG. 19. FIG. 19 is a schematic diagram of a structure of a device according to an embodiment of this application. The vehicle and the server may be implemented by using structures in FIG. 19. The device 60 includes at least one processor 601, at least one memory 602, and at least one communications interface 603. In addition, the device may further include a general-purpose component such as an antenna. Details are not described herein.

The processor 601 may be a general-purpose central processing unit (CPU), a microprocessor, an application-specific integrated circuit (ASIC), or one or more integrated circuits configured to control execution of programs for the foregoing solutions.

The communications interface 603 is used for communications with another device or a communications network, for example, an OTA server, a key server, or an in-vehicle device.

The memory 602 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other compact disk storage, optical disc storage (including a compressed optical disc, a laser disc, an optical disc, a digital general-purpose optical disc, a Blu-ray optical disc, or the like), or magnetic disk storage media or other magnetic storage devices, or any other medium that can be accessed by a computer and that can be used to carry or store expected program code in an instruction form or in a data structure form. This is not limited thereto. The memory may exist independently, and is connected to the processor through a bus. The memory may alternatively be integrated with the processor.

The memory 602 is configured to store application program code for performing the foregoing solutions, and the processor 601 controls execution of the application program code. The processor 601 is configured to execute the application program code stored in the memory 602.

When the device shown in FIG. 19 is the vehicle 100, the code stored in the memory 602 may be used to execute the methods for obtaining a file based on an OTA technology provided in FIG. 11A to FIG. 15B. For example, the method includes: obtaining a target request, where the target request includes target service information, and the target service information is used to obtain a target file associated with a target function; sending the target request to a server; and receiving the target file requested by the target request, where the target file is used to indicate the first vehicle to implement the target function.

It should be noted that for functions of the functional units in the vehicle described in this embodiment of this application, reference may be made to the related descriptions of operations performed by the first vehicle in the foregoing method embodiments in FIG. 11A to FIG. 15B. Details are not described herein again.

When the device shown in FIG. 19 is the server 300, the code stored in the memory 602 may be used to execute the methods for obtaining a file based on an OTA technology provided in FIG. 11A to FIG. 15B. For example, the method includes: receiving a target request sent by a first vehicle, where the target request includes target service information, and the target service information is used to obtain a target file associated with a target function; generating the corresponding target file based on the target request; and sending the target file to the first vehicle, where the target file is used to indicate the first vehicle to implement the target function.

It should be noted that for functions of the functional units in the server described in this embodiment of this application, reference may be made to the related descriptions of operations performed by the server in the foregoing method embodiments in FIG. 11A to FIG. 15B. Details are not described herein again.

An embodiment of this application further provides a computer storage medium. The computer storage medium may store a program. When the program is executed, some or all of the steps of any of the methods for obtaining a file based on an OTA technology in the foregoing method embodiments may be performed.

An embodiment of this application further provides a computer program. The computer program includes instructions. When the computer program is executed by a computer, the computer may perform some or all steps of any of the methods for obtaining a file based on an OTA technology.

An embodiment of this application further provides a system for obtaining a file based on an OTA technology. The system includes a server and a vehicle. The vehicle is any vehicle according to the embodiment corresponding to FIG. 16 and FIG. 17. The server is any server according to the embodiment corresponding to FIG. 18.

An embodiment of this application further provides a chip system. The chip system includes a processor, configured to support a vehicle or a server in implementing a function in the foregoing aspects, for example, receiving or processing data and/or information in the foregoing method.

In a possible design, the chip system further includes a memory. The memory is configured to store program instructions and data that are necessary for the vehicle or the server. The chip system may include a chip, or may include a chip and another discrete component.

In the foregoing embodiments, descriptions of each embodiment have respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification are example embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic or other forms.

The foregoing units described as separate parts may or may not be physically separate. The parts displayed as units may or may not be physical units, in other words, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the conventional technologies, or all or some of the technical solutions may be implemented in a form of a software product. The computer software product is stored in a storage medium and includes several instructions for instructing a computer device (which may be a personal computer, a server, or a network device, and specifically, may be a processor in the computer device) to perform all or some of the steps of the methods described in embodiments of this application. The foregoing storage medium may include any medium that can store program code, such as a USB flash drive, a removable hard disk, a magnetic disk, an optical disk, a read-only memory (ROM), or a random access memory (RAM).

In conclusion, the foregoing embodiments are merely intended for describing the technical solutions of this application, but not for limiting this application. Although this application is described in detail with reference to the foregoing embodiments, a person of ordinary skill in the art should understand that modifications may still be made to the technical solutions described in the foregoing embodiments or equivalent replacements may be made to some technical features thereof, without departing from the spirit and the scope of the technical solutions of embodiments of this application.

What is claimed is:

1. A method for obtaining a file based on an over-the-air (OTA) technology, wherein the method comprises:
    obtaining, by a first vehicle, target service information, wherein the target service information is used to obtain a target file associated with a target function;
    requesting, by the first vehicle, the target file from a server based on the target service information; and
    receiving, by the first vehicle, the target file requested, and
    wherein the first vehicle comprises a master vehicle control unit and one or more slave vehicle control units, the target function is a function implemented by a target slave vehicle control unit in the one or more slave vehicle control units, and the receiving, by the first vehicle, the target file requested comprises:
        receiving, by the master vehicle control unit, the target file requested; and
        sending, by the master vehicle control unit, the target file to the target slave vehicle control unit, wherein the target file is used to indicate the target slave vehicle control unit to implement the target function based on the target file.

2. The method according to claim 1, wherein the method further comprises:
    performing, by the first vehicle, signature verification on the target file; and
    when signature verification of the target file succeeds, implementing, by the first vehicle, the target function based on the target file.

3. The method according to claim 1, wherein the method further comprises:
    checking, by the first vehicle, validity of the target file; and
    when validity check of the target file succeeds, implementing, by the first vehicle, the target function based on the target file.

4. The method according to claim 3, wherein the requesting, by the first vehicle, the target file from a server comprising:
    sending hardware information of the first vehicle to the server, the target file comprises a device feature code corresponding to the hardware information, and the checking, by the first vehicle, validity of the target file comprises:
    determining, by the first vehicle, whether the hardware information matches the device feature code; and when the hardware information matches the device feature code, determining that the target file is a valid file.

5. The method according to claim 1, wherein the requesting, by the first vehicle, the target file from a server further comprising:
    sending at least one piece of software version information corresponding to the first vehicle, and the method further comprises:
    receiving, by the first vehicle, an installation package that is of software corresponding to the target function and that is sent by the server, and performing signature verification on the installation package, wherein the installation package is sent by the server when the server detects, based on the target service information and the software version information, that the software corresponding to the target function is not installed on the first vehicle; and
    when signature verification of the installation package succeeds, installing, on the first vehicle based on the installation package, the software corresponding to the target function, and implementing the target function based on the software corresponding to the target function and the target file.

6. The method according to claim 1, wherein the first vehicle further comprises a human-machine interface, and the obtaining, by a first vehicle, target service information comprises:
    obtaining, by the first vehicle, the target service information through the human-machine interface.

7. The method according to claim 1, wherein the obtaining, by a first vehicle, target service information comprises:
    obtaining, by the first vehicle, the target service information through a terminal device.

8. The method according to claim 1, wherein the method further comprises:
    sending, by the first vehicle, a state of the target function to the server, wherein the state of the target function comprises at least one of whether the target function is implemented and a validity period of the target function.

9. A method for obtaining a file based on an over-the-air (OTA) technology, wherein the method comprises:
    receiving, by a server, a request sent by a first vehicle, wherein the request is used to obtain a target file associated with a target function;
    generating, by the server, the target file corresponding to the target function based on the request; and
    sending, by the server, the target file to the first vehicle,
    wherein the first vehicle comprises a master vehicle control unit and one or more slave vehicle control units, the target function is a function implemented by a target slave vehicle control unit in the one or more slave vehicle control units, and the first vehicle,
        receives, by the master vehicle control unit, the target file requested; and
        sends, by the master vehicle control unit, the target file to the target slave vehicle control unit, wherein the target file is used to indicate the target slave vehicle control unit to implement the target function based on the target file.

10. The method according to claim 9, wherein the method further comprises:
   signing, by the server, the target file.

11. The method according to claim 9, wherein the request further comprises at least one piece of software version information corresponding to the first vehicle and target service information, and the method further comprises:
   detecting, by the server based on the at least one piece of software version information and the target service information, whether software corresponding to the target function is installed on the first vehicle; and
   when the software corresponding to the target function is not installed on the first vehicle, sending, by the server to the first vehicle, an installation package of the software corresponding to the target function, wherein the installation package is used to install, on the first vehicle based on the installation package, the software corresponding to the target function.

12. The method according to claim 9, wherein the request further comprises one or more of a validity period of the target function, hardware information of the first vehicle, and at least one piece of software version information corresponding to the first vehicle.

13. The method according to claim 12, wherein the generating, by the server, the corresponding target file based on the request comprises:
   generating, by the server, a device feature code based on the hardware information of the first vehicle;
   generating, by the server, a resource control item and a function control item based on the at least one piece of software version information corresponding to the first vehicle; and
   generating, by the server, the target file based on the target service information, the validity period of the target function, the device feature code, the resource control item, and the function control item.

14. The method according to claim 9, wherein the method further comprises:
   receiving, by the server, a state of the target function sent by the first vehicle, wherein the state of the target function comprises at least one of whether the target function is enabled and the validity period of the target function.

15. The method according to claim 9, wherein the target file comprises a use license file of the target function.

16. A vehicle, wherein the vehicle comprises a non-transitory memory configured to store instructions, and a processor coupled to the memory and configured to execute the instructions to cause the vehicle to: obtain target service information, and the target service information is used to obtain a target file associated with a target function;
   request the target file from a server; and
   receive the target file requested, wherein the target file is used to indicate the vehicle to implement the target function,
   wherein the vehicle comprises a master vehicle controller and one or more slave vehicle controller, the target function is a function implemented by a target slave vehicle controller in the one or more slave vehicle controllers, and the processor is configured to execute the instructions to cause the master vehicle controller to:
     receive the target file requested; and
     send the target file to the target slave vehicle controller, wherein the target file is used to indicate the target slave vehicle controller to implement the target function based on the target file.

17. The vehicle according to claim 16, wherein the processor is further configured to execute the instructions to cause the vehicle to:
   perform signature verification on the target file, wherein the vehicle implements the target function based on the target file if signature verification of the target file succeeds.

18. The vehicle according to claim 16, wherein the processor is further configured to execute the instructions to cause the vehicle to:
   check validity of the target file, wherein the vehicle implements the target function based on the target file when validity check of the target file succeeds.

19. The vehicle according to claim 18, wherein the processor is specifically configured to execute the instructions to cause the vehicle to:
   send hardware information of the vehicle to the server, wherein the target file comprises a device feature code generated based on the hardware information;
   determine whether the hardware information matches the device feature code; and
   when the hardware information matches the device feature code, determine that the target file is a valid file.

20. A server, wherein the server comprises a non-transitory memory configured to store instructions, and a processor coupled to the memory and configured to execute the instructions to cause the server to:
   receive a request sent by a first vehicle, wherein the request is used to obtain a target file associated with a target function;
   generate the target file corresponding to the target function based on the request; and
   send the target file to the first vehicle, wherein the target file is used to indicate the first vehicle to implement the target function,
   wherein the first vehicle comprises a master vehicle control unit and one or more slave vehicle control units, the target function is a function implemented by a target slave vehicle control unit in the one or more slave vehicle control units, and the first vehicle,
   receives, by the master vehicle control unit, the target file requested; and
   sends, by the master vehicle control unit, the target file to the target slave vehicle control unit, wherein the target file is used to indicate the target slave vehicle control unit to implement the target function based on the target file.

21. The server according to claim 20, wherein the processor is further configured to execute the instructions to cause the server to:
   sign the target file.

22. The server according to claim 20, wherein the request further comprises at least one piece of software version information corresponding to the first vehicle and target service information; and the processor is further configured to execute the instructions to cause the server to:
   detect, based on the at least one piece of software version information and the target service information, whether software corresponding to the target function is installed on the first vehicle; and
   when the software corresponding to the target function is not installed on the first vehicle, send, to the first vehicle, an installation package of the software corresponding to the target function, wherein the installation package is used to install, on the first vehicle based on the installation package, the software corresponding to the target function.

23. The server according to claim 20, wherein the request further comprises one or more of a validity period of the target function, hardware information of the first vehicle, and at least one piece of software version information corresponding to the first vehicle.

24. The server according to claim 23, wherein the processor is configured to execute the instructions to cause the server to:
- generate a device feature code based on the hardware information of the first vehicle;
- generate a resource control item and a function control item based on the at least one piece of software version information corresponding to the first vehicle; and
- generate the target file based on the target service information, the validity period of the target function, the device feature code, the resource control item, and the function control item.

* * * * *